United States Patent
Jeon et al.

(10) Patent No.: US 9,460,488 B2
(45) Date of Patent: Oct. 4, 2016

(54) INTERPOLATION METHOD AND PREDICTION METHOD USING SAME

(75) Inventors: Yong Joon Jeon, Seoul (KR); Jie Jia, Seoul (KR); Byeong Moon Jeon, Seoul (KR); Seung Wook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/130,180

(22) PCT Filed: Jul. 28, 2011

(86) PCT No.: PCT/KR2011/005573
§ 371 (c)(1),
(2), (4) Date: Feb. 10, 2014

(87) PCT Pub. No.: WO2013/002450
PCT Pub. Date: Jan. 3, 2013

(65) Prior Publication Data
US 2014/0153844 A1 Jun. 5, 2014

(30) Foreign Application Priority Data
Jun. 30, 2011 (KR) .................. 10-2011-0065192

(51) Int. Cl.
*G06K 9/32* (2006.01)
*G06T 3/40* (2006.01)
(Continued)

(52) U.S. Cl.
CPC ........... *G06T 3/4007* (2013.01); *H04N 19/523* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 5,751,902 A | * | 5/1998 | Hofmann ................ G10L 19/06 704/219 |
| 7,224,733 B1 | | 5/2007 | Benzler |
| 7,336,720 B2 | * | 2/2008 | Martemyanov ..... H03M 7/4006 375/240.12 |

(Continued)

FOREIGN PATENT DOCUMENTS

| CN | 1694495 | 11/2005 |
|---|---|---|
| CN | 101641960 | 2/2010 |

(Continued)

OTHER PUBLICATIONS

Liu et al, Fractional-Pel Motion Refinement Based on Hierarchical Adjustable Dual-Parabola Model, International Symposium on Communications and Information Technologies 2004 ( ISCIT 2004 ) Sapporo, Japan, Oct. 26-29, 2004.*

(Continued)

*Primary Examiner* — Andrae S Allison
(74) *Attorney, Agent, or Firm* — Fish & Richardson P.C.

(57) ABSTRACT

The present invention relates to a method of performing interpolation for prediction between screens by using a pixel sample of a current picture and a pixel sample of a reference picture, and a prediction method using same. The interpolation method according to the present invention includes: calculating movement information for generating a prediction block; and generating a partial pixel sample on the basis of an integer sample set including integer pixel samples to which an interpolation filter is applied. Here, the integer sample set includes at least one current integer sample used to generate a partial pixel sample among restored integer pixel samples of a current picture, and the partial pixel sample corresponds to the offset positions of a partial pixel unit from a predetermined reference pixel sample among integer pixel samples.

14 Claims, 19 Drawing Sheets

(51) Int. Cl.
H04N 19/82 (2014.01)
H04N 19/523 (2014.01)

(56) References Cited

U.S. PATENT DOCUMENTS

| | | | | |
|---|---|---|---|---|
| 8,804,831 | B2* | 8/2014 | Karczewicz | H04N 19/00739 375/240.16 |
| 2003/0206594 | A1* | 11/2003 | Zhou | H04N 19/105 375/240.16 |
| 2005/0243926 | A1 | 11/2005 | Hubrich et al. | |
| 2005/0276326 | A1* | 12/2005 | Drezner | H04N 19/176 375/240.12 |
| 2006/0072676 | A1* | 4/2006 | Gomila | H04N 19/61 375/240.27 |
| 2006/0294171 | A1* | 12/2006 | Bossen | H04N 19/139 708/300 |
| 2007/0053433 | A1* | 3/2007 | Song | H04N 19/147 375/240.13 |
| 2008/0089417 | A1* | 4/2008 | Bao | H04N 19/176 375/240.16 |
| 2008/0095471 | A1* | 4/2008 | Kim | G06F 17/17 382/300 |
| 2008/0175322 | A1* | 7/2008 | Lee | H04N 19/523 375/240.16 |
| 2008/0247467 | A1* | 10/2008 | Rusanovskyy | H04N 7/12 375/240.16 |
| 2009/0257500 | A1* | 10/2009 | Karczewicz | H04N 19/00739 375/240.16 |
| 2011/0188571 | A1* | 8/2011 | Maani | H04N 19/61 375/240.12 |
| 2011/0200113 | A1 | 8/2011 | Kim | |
| 2012/0213281 | A1* | 8/2012 | Choi | H04N 19/52 375/240.16 |
| 2012/0288007 | A1* | 11/2012 | Lee | H04N 19/103 375/240.16 |
| 2012/0301040 | A1* | 11/2012 | Yie | H04N 19/176 382/233 |
| 2013/0182780 | A1* | 7/2013 | Alshin | H04N 19/59 375/240.29 |
| 2013/0202030 | A1* | 8/2013 | Song | H04N 19/00569 375/240.03 |
| 2014/0056352 | A1* | 2/2014 | Park | H04N 19/00751 375/240.12 |

FOREIGN PATENT DOCUMENTS

| | | |
|---|---|---|
| EP | 1 592 248 A1 | 11/2005 |
| JP | 2001-510966 A | 8/2001 |
| JP | 2003179933 A | 6/2003 |
| JP | 2005318297 A | 11/2005 |
| JP | 2007124605 A | 5/2007 |
| JP | 2007129370 A | 5/2007 |
| JP | 2009118303 A | 5/2009 |
| JP | 2011517237 A | 5/2011 |
| KR | 10-2006-0047595 A | 5/2006 |
| KR | 10-2010-0042542 A | 4/2010 |
| WO | WO 99/04574 A1 | 1/1999 |
| WO | WO2008091068 A1 | 7/2008 |
| WO | WO2009126911 A1 | 10/2009 |
| WO | WO2010007719 A1 | 1/2010 |
| WO | WO 2010/044569 A2 | 4/2010 |
| WO | WO2012028102 A1 | 3/2012 |

OTHER PUBLICATIONS

Wei Dai, Oscar C. Au, Sijin Li, Lin Sun, Ruobing Zou, "Fast Sub-Pixel Motion Estimation with Simplified Modeling in HEVC", IEEE International Symposium on Circuits and Systems (ISCAS), 2012.*

Weiyao Lin, Krit Panusopone, David M. Baylon, Ming-Ting Sun, Zhenzhong Chen and Hongxiang Li "A Fast Sub-Pixel Motion Estimation Algorithm for H.264/AVC Video Coding" IEEE Transactions on Circuits and Systems for Video Technology, vol. 21, No. 2, Feb. 2011.*

Wu Qiang; Xu Ying; Jia Kebin; Li Xuwen, "An improved inter-prediction motion estimation algorithm of AVS," in Broadband Network & Multimedia Technology, 2009. IC-BNMT '09. 2nd IEEE International Conference on , vol., No., pp. 226-231, Oct. 18-20, 2009.*

Young-Long et al, Motion Compensation, Dec. 2009, DOI: 10.1007/978-1-4419-0959-6_5, In book: VLSI Design for Video Coding, pp. 73-83.*

Office Action dated Jun. 16, 2015 from corresponding Japanese Patent Application No. 2014-518776, 3 pages.

K. McCann et al., "HMC: High Efficiency Video Codeo (HEVC) Test Model 3 Encoder Description", Joint Collaborative Team on Video Coding (JCT-VC) of ITU-T SG16 WP3 and ISO/IEC JTC1/SC29/WG11, 5th Meeting: Geneva, CH, Mar. 16-23, 2011 (XP030009013), 34 pages.

T. Weigand et al., "WD3: Working Draft of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 2011 (XP030009014), 160 pages.

Search Report dated Nov. 3, 2014 for corresponding European Patent Application No. 11868759.9, 7 pages.

International Search Report dated May 4, 2012 for Application No. PCT/KR2011/005573, with English Translation, 4 pages.

Office Action dated Feb. 17, 2015 from corresponding Japanese Patent Application No. 2014-518776, 3 pages.

* cited by examiner

FIG. 13

| P3 | ab | ac | ad | ae | af | ag | ah |
|----|----|----|----|----|----|----|----|
| ba | bb | bc | bd | be | bf | bg | bh |
| ca | cb | cc | cd | ce | cf | cg | ch |
| da | db | dc | dd | de | df | dg | dh |
| ea | eb | ec | ed | ee | ef | eg | eh |
| fa | fb | fc | fd | fe | ff | fg | fh |
| ga | gb | gc | gd | ge | gf | gg | gh |
| ha | hb | hc | hd | he | hf | hg | hh |

1130B

INTERPOLATION METHOD AND PREDICTION METHOD USING SAME

CROSS REFERENCE TO RELATED APPLICATIONS

This application is a U.S. National Phase Application under 35 U.S.C. §371 of International Application PCT/KR2011/005573, filed on Jul. 28, 2011, which claims the benefit of Korean Application No. 10-2011-0065192, filed on Jun. 30, 2011, the entire content of the prior applications is hereby incorporated by reference.

TECHNICAL FIELD

The present invention relates to a video compressing technique, and more particularly, to an interpolation method in inter-picture prediction.

BACKGROUND ART

In recent years, demands for a high-resolution and high-quality image have increased in various fields of applications. As an image has a higher resolution and higher quality, an amount of data on the image increases more and more. Accordingly, when image data is transferred using media such as existing wired or wireless broadband lines or image data is stored in existing storage media, the transfer cost and the storage cost of data increase.

In order to effectively transfer, store, and reproduce information on high-resolution and high-quality images, high-efficiency image compression techniques can be utilized.

SUMMARY OF THE INVENTION

Technical Problem

An object of the present invention is to provide interpolation method and device for effectively performing inter-picture prediction.

Another object of the present invention is to provide interpolation method and device using reconstructed pixel samples of a current picture and reference pixel samples of a reference picture together.

Still another object of the present invention is to provide method and device for performing interpolation by applying a smoothing filter to reconstructed pixel samples of a current picture so as to reduce discontinuity at a boundary of a predicted block (prediction block) generated by interpolation.

Still another object of the present invention is to provide method and device for causing a decoder to recognize information on reconstructed pixel samples of a current picture which are used for interpolation.

Solution to Problem

According to an aspect of the present invention, there is provided an interpolation method including the steps of: calculating motion information for generating a predicted block; and generating fractional pixel samples on the basis of an integer sample set including integer pixel samples to which an interpolation filter is applied, wherein the integer sample set includes at least one current integer sample used to generate the fractional pixel samples out of reconstructed integer pixel samples of a current picture, and wherein the fractional pixel samples correspond to offset positions in the unit of fractional pixels from a predetermined reference pixel sample out of the integer pixel samples.

In this aspect, the interpolation method may be performed on luma pixels, and the step of generating the fractional pixel samples may include setting a predetermined number of current integer samples to be included in the integer sample set depending on the position of the reference pixel sample.

For example, three current integer samples may be included in the integer sample set when the reference pixel sample is located in a first integer sample column or row from a boundary between a reconstructed pixel sample area of a current picture and a reference sample area of a reference picture used for the interpolation, two current integer samples may be included in the integer sample set when the reference pixel sample is located in a second integer pixel sample column or row from the boundary, and one current integer sample may be included in the integer sample set when the reference pixel sample is located in a third integer pixel sample column or row form the boundary.

The interpolation method according to the aspect may further include a step of applying a smoothing filter, which uses at least one reference pixel sample and at least one reconstructed pixel sample of the current picture, to at least one current integer sample out of the current integer samples before generating the fractional pixel samples.

In this case, a smoothing filter may be applied to the current integer sample closest to the boundary between the reconstructed pixel sample area of the current picture and the reference sample area of the reference picture, which are used for the interpolation, before generating the fractional pixel samples.

In this aspect, the interpolation method may be performed on chroma pixels, and the step of generating the fractional pixel samples may include setting a predetermined number of current integer samples to be included in the integer sample set depending on the position of the reference pixel sample.

For example, one current integer sample may be included in the integer sample set when the reference pixel sample is located in a first integer sample column or row from a boundary between a reconstructed pixel sample area of a current picture and a reference sample area of a reference picture which are used for the interpolation.

When the interpolation method is performed on chroma pixels, the interpolation method according to the aspect may further include a step of applying a smoothing filter, which uses at least one reference pixel sample and at least one reconstructed pixel sample of the current picture, to at least one current integer sample out of the current integer samples before generating the fractional pixel samples.

The interpolation method according to the aspect may further include a step of determining whether an implicit or explicit instruction to use the reconstructed integer pixel samples of the current picture to create the fractional pixel samples is transmitted from an encoder, and when it is determined that the instruction is transmitted, the reconstructed integer pixel samples of the current picture are used to generate the fractional pixel samples.

In this case, the explicit instruction may be 1-bit flag information which is transmitted from the encoder to a decoder along with pixel position information and information on an array of reference pixel samples.

When a difference between a motion vector of a current prediction unit and a motion vector of a neighboring block of the current prediction unit is equal to or less than a predetermined threshold value, it may be determined that an implicit instruction to use the reconstructed integer pixel samples of the current picture to generate the fractional pixel samples is transmitted.

In addition, the interpolation method may be performed on luma pixels, and the reconstructed integer pixel samples of the current picture may be used for the interpolation when a reference integer sample is located within a third integer sample row/column from an upper or left boundary of a reference sample area of a reference picture used for the interpolation.

The interpolation method may be performed on chroma pixels, and the reconstructed integer pixel samples of the current picture are used for the interpolation without receiving an instruction form an encoder when a reference integer sample is located within a first integer sample row/column from an upper or left boundary of a reference sample area of a reference picture used for the interpolation.

According to another aspect of the present invention, there is provided an interpolation device including: a prediction unit determining module that determines a prediction unit in a current coding unit; and an interpolation module that generates fractional pixel samples on the basis of integer pixel samples, wherein the interpolation module generates the fractional pixel samples by applying an interpolation filter to a predetermined number of integer pixel samples on the basis of pixel sample position information and information on a reference pixel sample array, wherein at least one integer pixel sample out of reconstructed integer pixel samples of a current picture is included in the integer pixel samples to which the interpolation filter is applied, and wherein the fractional pixel samples correspond to offset positions in the unit of fractional pixels from a predetermined reference pixel sample out of the integer pixel samples.

Supposed that the integer pixel samples to which the interpolation filter is applied are luma pixel samples, three current integer samples may be included in the integer sample set when the reference pixel sample is located in a first integer sample column or row from a boundary between a reconstructed pixel sample area of a current picture and a reference sample area of a reference picture used for the interpolation, two current integer samples may be included in the integer sample set when the reference pixel sample is located in a second integer pixel sample column or row from the boundary, and one current integer sample may be included in the integer sample set when the reference pixel sample is located in a third integer pixel sample column or row form the boundary.

Supposed that the integer pixel samples to which the interpolation filter is applied are chroma pixel samples, one current integer sample may be included in the integer sample set when the reference pixel sample is located in a first integer sample column or row from a boundary between a reconstructed pixel sample area of a current picture and a reference sample area of a reference picture which are used for the interpolation.

According to still another aspect of the present invention, there is provided an inter prediction method including the steps of: calculating a motion vector for generating a predicted block; performing an interpolation process of generating pixel samples in the unit of sub pixels when the motion vector indicates a sub pixel position; and generating the predicted block on the basis of the motion vector and the pixel samples in the unit of sub pixels, wherein reconstructed pixel samples of a current picture and pixel samples of a reference picture are together used for the interpolation process.

In this aspect, the reconstructed pixel samples of the current picture used for the interpolation may be located in an upper or left area of a current prediction unit.

A smoothing process using at least one of the reconstructed pixel samples of the current picture and at least one pixel sample of the reference picture may be performed on the reconstructed pixel samples of the current picture before the step of performing the interpolation process.

According to still another aspect of the present invention, there is provided an interpolation method including the steps of: calculating a motion vector for generating a predicted block; and performing an interpolation process of generating pixel samples in the unit of sub pixels when the motion vector indicates a sub pixel position, wherein reconstructed pixel samples of a current picture and pixel samples of a reference picture are together used for the interpolation process.

In this aspect, the reconstructed pixel samples of the current picture used for the interpolation may be located in an upper or left area of a current prediction unit.

A smoothing process using at least one of the reconstructed pixel samples of the current picture and at least one pixel sample of the reference picture may be performed on the reconstructed pixel samples of the current picture before the step of performing the interpolation process.

Advantageous Effects

According to the aspects of the present invention, it is possible to enhance efficiency of inter-picture prediction by performing interpolation using reconstructed pixel samples of a current picture and reference pixel samples of a reference picture together.

According to the aspects of the present invention, it is possible to reduce discontinuity at a boundary of a predicted block generated by interpolation by performing interpolation by applying a smoothing filter to reconstructed pixel samples of a current picture so as to.

According to the aspects of the present invention, it is possible to enhance accuracy of video encoding/decoding by causing a decoder to recognize information on reconstructed pixel samples of a current picture which are used for interpolation and to perform interpolation.

BRIEF DESCRIPTION OF THE DRAWINGS

FIG. 13 is a diagram schematically illustrating an interpolation area for chroma pixel samples according to an embodiment of the present invention.

DESCRIPTION OF EXEMPLARY EMBODIMENTS

Figure 1:
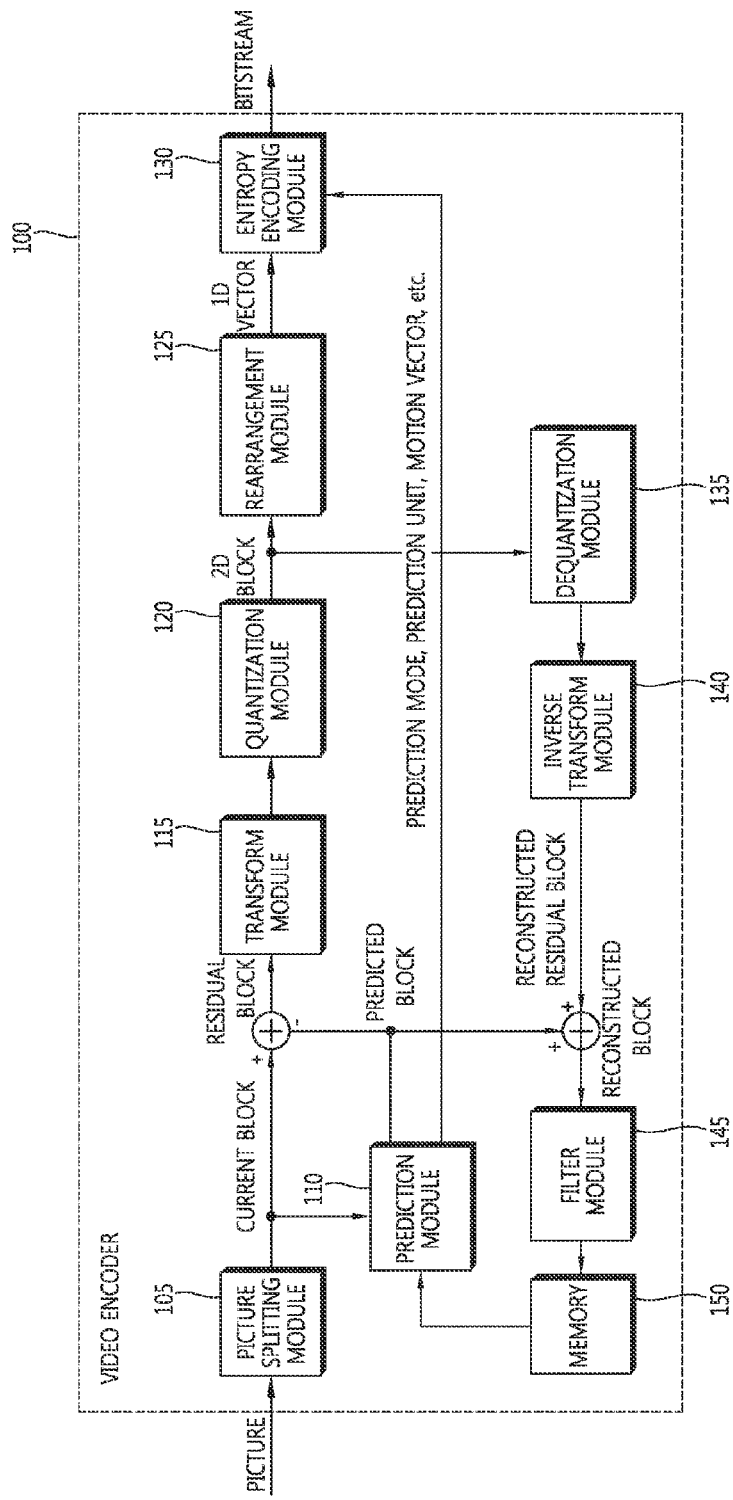
FIG. 1 is a block diagram schematically illustrating a video encoder according to an embodiment of the present invention.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the present invention. Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 can split an input picture into at least one process unit. Here, the process unit may be a prediction unit (hereinafter, referred to as a "PU"), a transform unit (hereinafter, referred to as a "TU"), or a coding unit (hereinafter, referred to as a "CU"). The video encoder 100 performs intra prediction or inter prediction by prediction units, transforms a video by transform units, and encodes the video by coding units, as will be described later.

The prediction module 110 includes an inter prediction module that performs an inter prediction process and an intra prediction module that performs an intra prediction process, as will be described later. The prediction module 110 performs the inter prediction or the intra prediction on the prediction unit supplied from the picture splitting module 105 depending on the prediction mode and generates a predicted block (prediction block). A residual between the generated prediction block (predicted block) and the original block is input to the transform module 115. Prediction mode information, motion vector information, and the like used for the prediction along with residual values are encoded and transmitted to a decoder by the entropy encoding unit 130.

The transform module 115 may split a current coding unit into at least one transform unit. At this time, the transform unit 115 may select an optimal transfer unit using a predetermined cost function for calculating a transfer cost. The transform module 115 may transform a residual block including residual value information between an original block and the predicted block generated by the prediction module 110 using a DCT (Discrete Cosine Transform) and/or a DST (Discrete Sine Transform). The transform module 115 may determine the transform unit on the basis of the coding unit.

The quantization module 120 may quantize the residual values transformed to the frequency domain by the transform module 115 and may generate quantization coefficients. The values calculated by the quantization module 120 are supplied to the dequantization module 135 and the rearrangement module 125.

The rearrangement module 125 may rearrange the quantization coefficients. By rearranging the quantization coefficients, it is possible to enhance the coding efficiency in the entropy encoding module 130. The rearrangement module 125 may rearrange the quantization coefficients (residual values) in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 may perform an entropy encoding process on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a coding unit, prediction mode information, split unit information, prediction unit information, transfer unit information, motion vector information, reference frame information, block interpolation information, and filtering information transmitted from the rearrangement module 125 and the prediction module 110.

For example, the entropy encoding module 130 may use a merging and skip method, a prediction unit merging method, an AMVP (Advanced Motion Vector Prediction) method, and the like to encode the motion vector information.

The merging and skip method is a method of generating a predicted block using motion prediction information (such as a motion vector and a reference picture index) of a selected block (merging block) out of neighboring blocks (merging candidate blocks) of a current block. The residual signal is 0 in the merging and skip method, but the residual signal is not 0 in the prediction unit merging method similarly using the motion prediction information of candidate blocks. Information on skip, an index of a merging block, and the like are encoded and transmitted in the merging and skip method, and a residual signal along with an index of a merging block is encoded and transmitted in the prediction unit merging method.

In the AMVP method, motion prediction information may be supplied from AMVP candidate blocks. In the AMVP method, the candidate blocks includes co-located blocks corresponding to the same positions in a reference picture in addition to neighboring blocks in the same picture. Therefore, when the AMVP method is used, a motion vector predictor and a residual value of a motion vector in addition to the reference picture index are encoded and transmitted to a decoder. The residual value of the motion vector is a difference value of a motion vector between a selected AMVP candidate block and a current prediction unit.

The dequantization module 135 dequantizes the values quantized by the quantization module 120. The inverse transform module 140 inversely transforms the values dequantized by the transform module 115. The residual values generated by the dequantization module 135 and the inverse transform module 140 may be merged with the predicted block predicted by the prediction module 110 to generate a reconstructed block.

The filter module 145 applies a deblocking filter and/or an ALF (Adaptive Loop Filter) to the reconstructed picture.

The deblocking filter may remove a block distortion generated at the boundary between blocks in the reconstructed picture.

The ALF (Adaptive Loop Filter) performs a filtering process on the basis of the resultant values of comparison of the original picture with the reconstructed picture of which the blocks have been filtered by the deblocking filter. In case of a luma signal, information on whether to apply the ALF may be transmitted by coding units (CU) and the size and coefficients of the ALF to be applied may vary depending on the blocks.

On the other hand, the filter module 145 may not perform a filtering process on the reconstructed block used for the inter prediction.

The memory 150 may store the reconstructed block or picture calculated by the filter module 145. The reconstructed block or picture stored in the memory 150 may be supplied to the prediction module 110 that performs the inter prediction.

Hereinafter, processes of encoding video information, which are performed by the elements of the encoder, will be described in more detail.

First, a coding unit, a prediction unit, and a transform unit of a picture will be described. A coding unit which is a split unit of a picture may be referred to as a CU as a unit on which an encoding process is performed by the video encoder. The coding unit may have sizes such as 64×64, 32×32, 16×16, and 8×8. The coding unit may have a depth based on a quad tree structure and may be split. A coding unit having the largest size may be defined as a largest coding unit (LCU) and a coding unit having the smallest size may be defined as a smallest coding unit SCU. The encoder may transmit information on the LCU and the SCU to the decoder, or may transmit any one of information on the LCU and information on the SCU and information (depth information) on the possible number of splitting times to the decoder.

Whether a coding unit is split on the basis of a quad tree structure as described above may be indicated by flag information such as a split flag.

Figure 2:
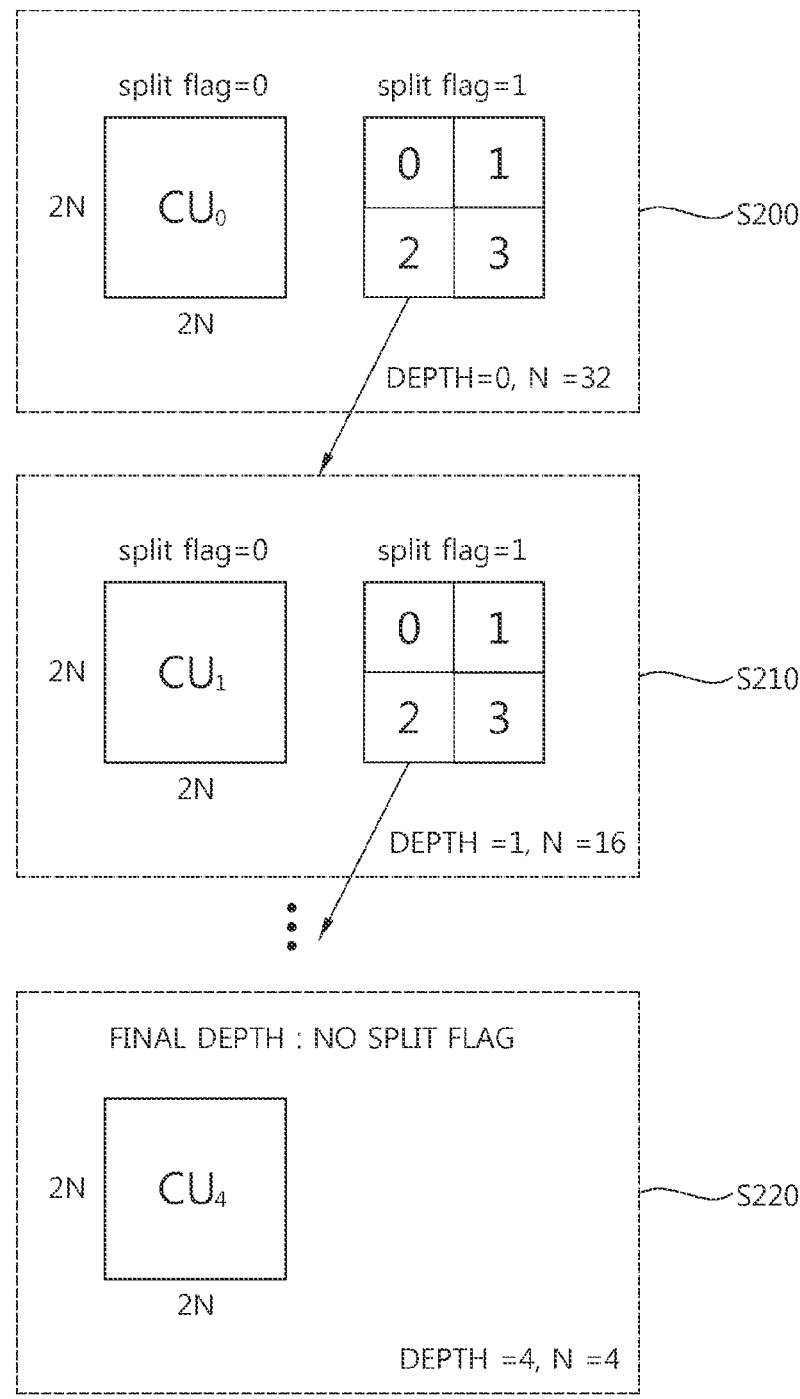
FIG. 2 is a conceptual diagram schematically illustrating an example where a largest coding unit is split into at least one coding unit according to the embodiment of the present invention.

FIG. 2 is a conceptual diagram schematically illustrating an example where a largest coding unit is split into at least one coding unit according to an embodiment of the present invention. Whether a coding unit is split may be indicated by depth information and a split flag.

a coding unit may be split to plural smaller coding units on the basis of size information, depth information, and split flag information of an LCU. The size information of the LCU, split depth information, and information on whether to split a current coding unit may be includes a sequence parameter set (SPS) of a bitstream and the split information of the current coding unit may be transmitted to the video decoder.

Referring to FIG. 2, S200 represents a block having a depth of 0 in a quad tree structure when the LCU has a size of 65×64. The left block in S200 represents a case where a flag indicating whether to be split is 0 and represents that a block (largest coding unit) having a depth of 0 in the quad tree structure is not split. The right bock in S200 represents a case where the flag indicating whether to be split is 1 and represents that a block having a depth of 0 is split into four coding units having a square form with a size of 32×32.

S210 represents a block with a depth of 1 which is once split when the size of the LCU is 64×64. The size of the coding unit having a depth of 1 is 32×32. In the left block of S210, the split flag is 0 and the coding unit with a size of 32×32 is not split and is encoded as a single coding unit. In the right block of S210, the split flag is 1 and the coding unit with a size of 32×32 is split into four coding units having a size of 16×16.

In the same way, one block in a quad tree structure may be sequentially split up to coding units with a smallest size depending on the depth information. For example, S220 represents that a coding unit is split up to coding units with a smallest size when the size of the largest coding unit is 64×64 and the maximum depth is 4 (the possible number of splitting times is 4). Here, the smallest coding unit cannot be split into smaller CUs any more and thus does not have a split flag.

For the purpose of convenience, it has been described that the largest coding unit and the possible number of splitting times (maximum depth) depending thereon are defined, but the smallest coding unit and the possible number of splitting times (maximum depth) may be defined as described above. For example, when the smallest coding unit is set to 8×8 and the possible number of splitting times is set to 4, the largest coding unit (64×64) may be derived from the smallest coding unit (8×8). Here, it has been described that the largest coding unit and the smallest coding unit are 64×64 and 8×8, respectively, but the SCU and the LCU may become larger or smaller than those in the above-mentioned examples.

Figure 3:
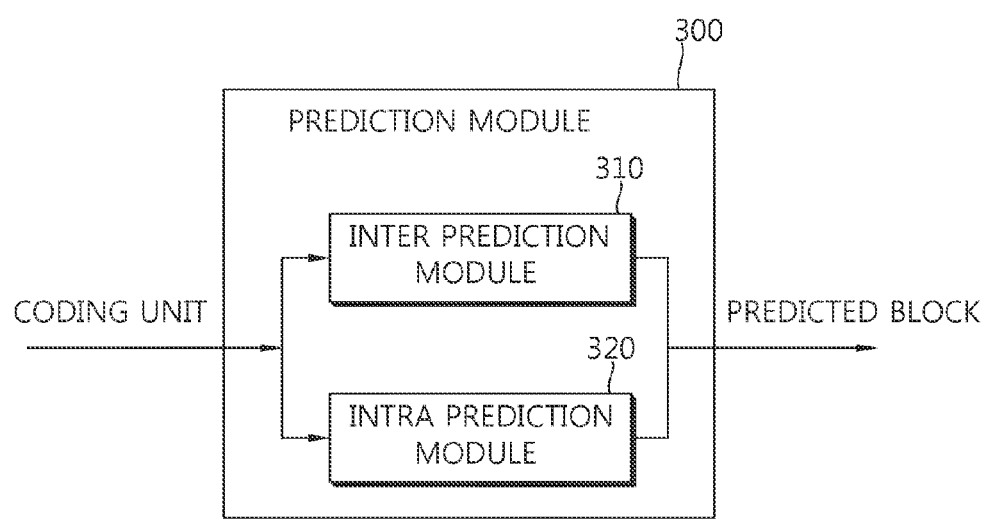
FIG. 3 is a conceptual diagram schematically illustrating a prediction module according to the embodiment of the present invention.

FIG. 3 is a conceptual diagram schematically illustrating a prediction module according to an embodiment of the present invention.

Referring to FIG. 3, a prediction module 200 includes an inter prediction module 310 and an intra prediction module 320.

The inter prediction module 310 may predict a prediction unit on the basis of information of at least one picture of a previous picture and/or a subsequent picture of a current picture. The intra prediction module 320 may predict a prediction unit on the basis of pixel information in a current picture. Depending on the prediction mode, that is, depending on whether to perform intra prediction or inter prediction, the picture splitting module 105 splits the prediction unit. At this time, the coding unit may be a prediction unit with a size of 2N×2N or N×N (where N is an integer) in the intra prediction mode, the coding unit may be a prediction unit with a size of 2N×2N, 2N×N, N×2N, or N×N in the intra prediction mode.

Figure 4:
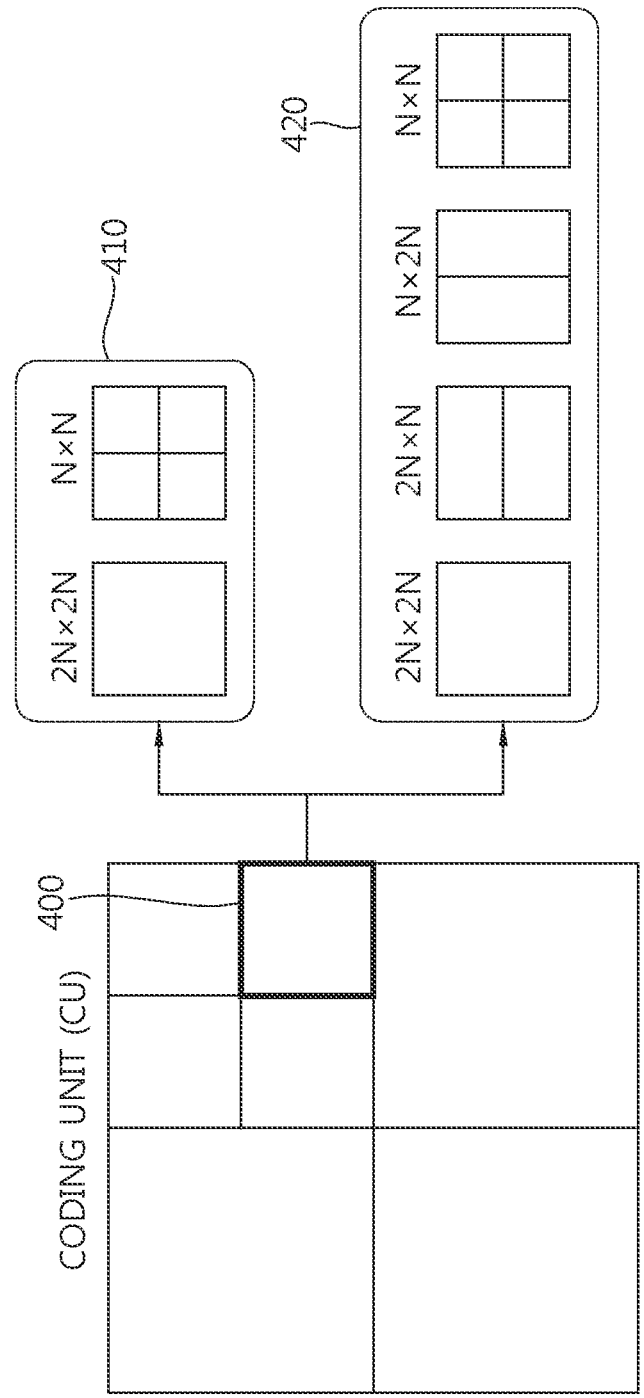
FIG. 4 is a diagram schematically illustrating a form of a predicted block by prediction modes.

FIG. 4 is a diagram schematically illustrating forms of a predicted block based on a prediction mode, where possible prediction units 410 in the intra prediction mode of a coding unit 400 and possible prediction units 420 in the inter prediction mode thereof are illustrated.

The inter prediction module selects a reference picture for the above-mentioned prediction unit and selects a reference block with the same size of the prediction unit in the unit of integer pixel samples. Then, the inter prediction module generates a predicted block, which is most similar to a current prediction unit, which minimizes a residual signal, and which minimizes the magnitude of a motion vector to be encoded, in the unit of integer pixel samples such as in the units of ½ pixel samples and ¼ pixel samples.

Here, a motion vector may be expressed in the unit of samples less than an integer pixel, and may be expressed in the unit of ¼ pixels for luma pixels, and may be expressed in the unit of ⅛ pixels for chroma pixels.

The index of a reference picture and the information on a motion vector, which have been selected by the inter prediction module, are encoded and transmitted to the decoder.

Figure 5:
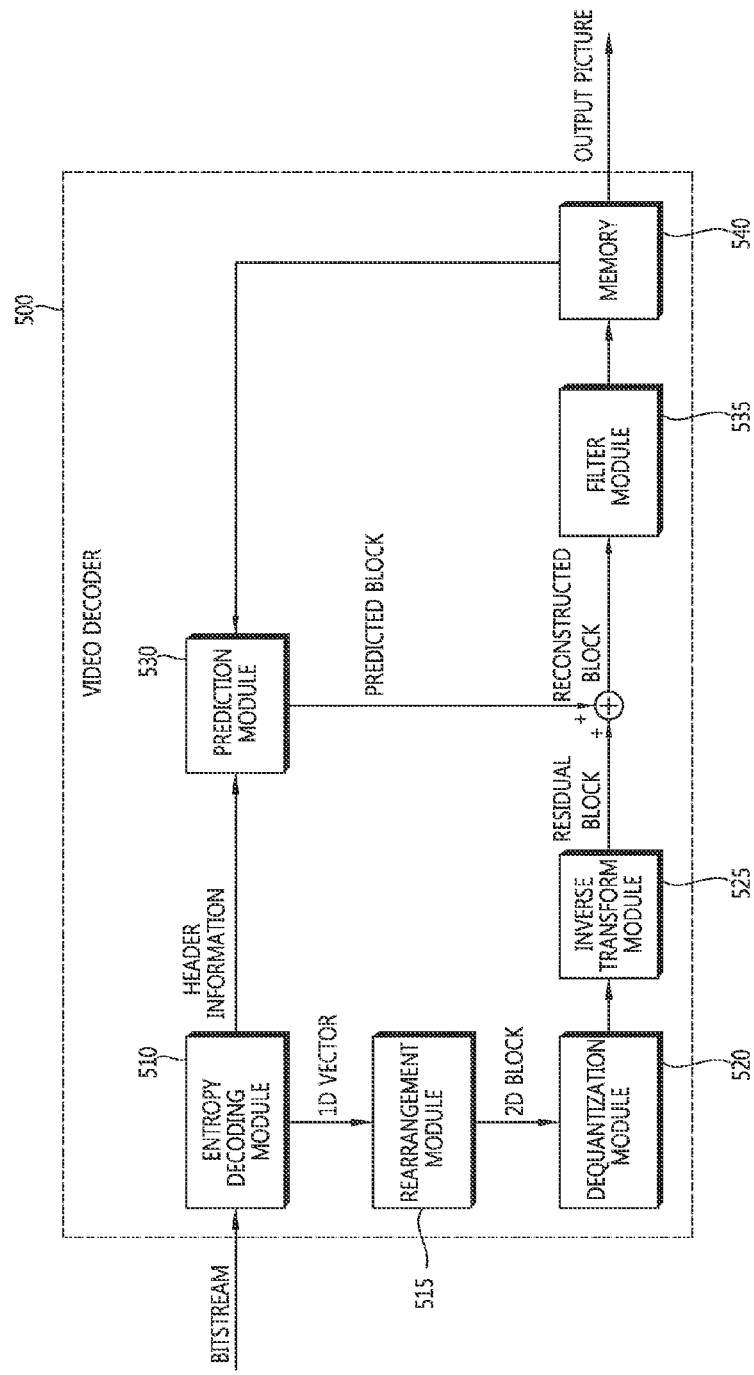
FIG. 5 is a block diagram schematically illustrating a video decoder according to an embodiment of the present invention.

FIG. 5 is a block diagram schematically illustrating a video decoder according to an embodiment of the present invention. Referring to FIG. 5, a video decoder 500 includes an entropy decoding module 510, a rearrangement module 515, a dequantization module 520, an inverse transform module 525, a prediction module 530, a filter module 535, and a memory 540.

When a video bitstream is input from the video encoder, the input bitstream may be decoded in the opposite order of the order in which video information is processed by the video encoder.

For example, when the video encoder uses a variable length coding (VLC) table to perform the entropy encoding process, the entropy decoding module 510 may implement the same VLC table and may perform a entropy decoding process. The entropy decoding module 510 may change a codeword allocation table using a counter or a direct swapping method similarly to the entropy encoding module and may perform the entropy decoding process using the changed codeword allocation table.

Information for generating a predicted block out of the information decoded by the entropy decoding module 510 may be supplied to the prediction module 530, and the residual values entropy-decoded by the entropy decoding module may be input to the rearrangement module 515.

The rearrangement module 515 may rearrange the bitstream entropy-decoded by the entropy decoding module 510 on the basis of the rearrangement method used in the video encoder. The rearrangement module 515 may reconstruct and rearrange coefficients expressed in the form of a one-dimensional vector into coefficients in the form of a two-dimensional block. The rearrangement module 515 may be supplied with information associated with the coefficient scanning performed by the video encoder and may perform the rearrangement using a method of inversely scanning the coefficients on the basis of the scanning order in which the scanning is performed by the video encoder.

The dequantization module 520 may perform dequantization on the basis of the quantization parameters supplied from the encoder and the coefficient values of the rearranged block.

The inverse transform module 525 may perform the inverse DCT and/or inverse DST of the DCT and DST, which has been performed by the transform module of the video encoder, on the quantization result from the video encoder. The inverse transform may be performed on the basis of a transfer unit determined by the video encoder. The transform module of the video encoder may selectively perform the DCT and the DST depending on plural information pieces such as the prediction method, the size of a current block, and the prediction direction, and the inverse transform module 525 of the video decoder may perform the inverse transform on the basis of the transform information on the transform performed by the transform module of the video encoder.

For example, in case of a 4×4 block, the inverse transform module 525 may perform an inverse transform process selectively using the inverse DCT and the inverse DST depending on the intra prediction mode of the block, or may selectively apply 1D-DCT+1D-DCT, 1D-DCT+1D-DST, 1D-DST+1D-DCT, or 1D-DST+1D-DST by combination of the DCT and the DST. The intra prediction mode information of the block may be supplied from the prediction module. The inverse transform module 525 may perform the inverse transform process by split units on the basis of split unit information supplied from the video encoder.

The prediction module 530 may generate a predicted block on the basis of the predicted block generation information supplied from the entropy decoding module 510 and the information on a previously-decoded block or picture supplied from the memory 540. A reconstructed block may be generated using the predicted block generated by the prediction module 530 and the residual block supplied from the inverse transform module 625.

The reconstructed block and/or picture may be supplied to the filter module 535. The filter module 535 performs a deblocking filtering process and/or an adaptive loop filtering process on the reconstructed block and/or picture. For example, the filter module 535 may include deblocking filter and/or ALF.

The memory 540 may store the reconstructed picture or block for use as a reference picture or a reference block and may supply the reconstructed picture to an output module.

Figure 6:
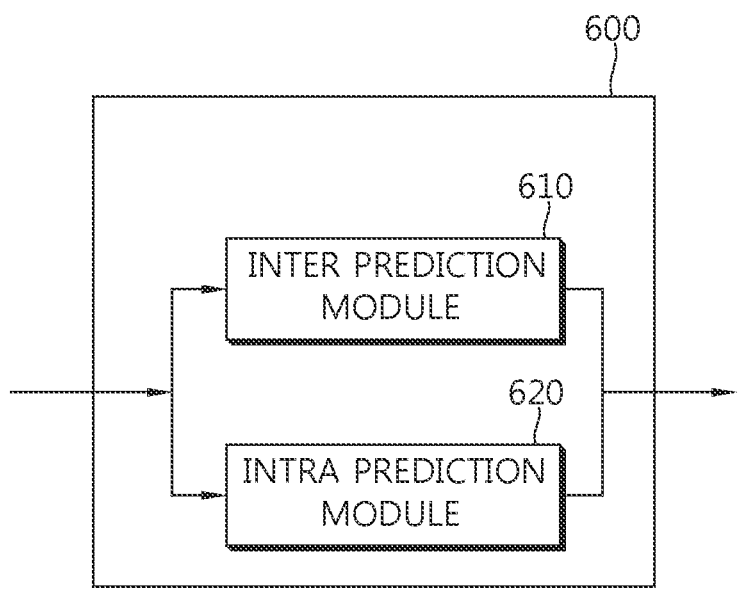
FIG. 6 is a conceptual diagram schematically illustrating a prediction module of the video decoder according to the embodiment of the present invention.

FIG. 6 is a conceptual diagram schematically illustrating the prediction module of the video decoder according to the embodiment of the present invention.

Referring to FIG. 6, the prediction module 600 may include an inter prediction module 610 and an intra prediction module 620.

The inter prediction module 610 may perform an inter prediction process on a current prediction unit on the basis of information included at least one picture of a previous picture and a subsequent picture of a current picture including the current prediction unit using information necessary for inter prediction of the current prediction unit, for example, information on a motion vector and a reference picture index, supplied from the video encoder when the prediction mode of the prediction unit is the inter prediction mode.

Here, after a skip flag, a merging flag, or the like of the coding unit which is received is confirmed, the motion information may be derived to correspond thereto. For example, when it is confirmed that the entropy decoding module uses a skip mode on the basis of a skip flag, the motion prediction information such as a motion vector and a reference picture index, which are included in a merging and skip candidate block indicated by a merging index of a prediction unit, may be used as motion information of a current prediction unit. Alternatively, when it is confirmed that the prediction unit is a prediction unit merging block, motion information of one prediction unit merging candidate block out of five prediction unit merging candidate blocks including four spatial merging candidate blocks located around the prediction unit and one temporal merging candidate block located in a reference picture may be used as the motion information of the prediction unit. When it is confirmed that the prediction unit is an AMVP block, the motion information of the prediction unit may be acquired from the video encoder using information on which AMVP block is used out of two spatial AMVP candidate blocks around the current prediction unit and a temporal AMVP candidate block included in another picture and motion vector difference information between the used AMVP candidate block and the current block.

When the motion vector in the motion information on the prediction unit acquired as described above is not an integer pixel unit, for example, when a motion vector of a luma pixel indicates a ½ or ¼ pixel position or a motion vector of a chroma pixel indicates a ½, ¼, or ⅛ pixel position, the inter prediction module 610 may perform an interpolation process of generating pixel samples less than an integer unit so as to generate a predicted block. The specific details of the interpolation process will be described later.

When the prediction mode of a prediction unit is an intra prediction mode, the intra prediction module 620 may generate a predicted block on the basis of pixel information in the current picture.

FIG. 6 illustrates that the prediction module 600 includes the respective functional elements for the purpose of convenience of explanation, but the present invention is not limited to this configuration and the prediction module may be embodied as a single element for performing the above-mentioned functions.

On the other hand, in the inter prediction, a predicted block may be generated from one or more previously-processed pictures (reference pictures) using block-based motion compensation. That is, a prediction unit of a current picture may be predicted using inter prediction on the basis of a reference picture. For example, a predicted block is selected from a reference picture through the use of motion estimation of a current prediction unit and a motion vector between the reference position of the current prediction unit and the reference position of the predicted block is calculated.

A motion vector (a difference value between a current block and a reference block) may have a sample resolution less than an integer unit, for example, may have a resolution of ¼ sample for a luma component and may have a resolution of ⅛ sample for a chroma component. Therefore, a predicted block more similar to the current prediction unit may be selected by generating fractional samples such as ½-unit pixel sample, ¼-unit pixel sample, and ⅛-unit pixel sample from integer samples (full samples) by interpolation and selecting a predicted block from a region including the fractional samples.

The fractional pixel samples less than an integer unit may be generated using an interpolation filter on the basis of a full sample. As described above, the resolution of the motion vector for luma pixels is a ¼ pixel sample and pixel information less than an integer pixel may be generated in the unit of ¼ pixels by interpolation. In order to perform an interpolation process on luma pixels, 8-tap interpolation filters (DCT-based Interpolation Filter) having different filter coefficients may be used.

The resolution of the motion vector for chroma pixels is a ⅛ pixel sample and pixel information less than an integer pixel may be generated in the unit of ⅛ pixels by interpolation. In order to perform an interpolation process on chroma pixels, 4-tap interpolation filters having different filter coefficients may be used.

Figure 7:
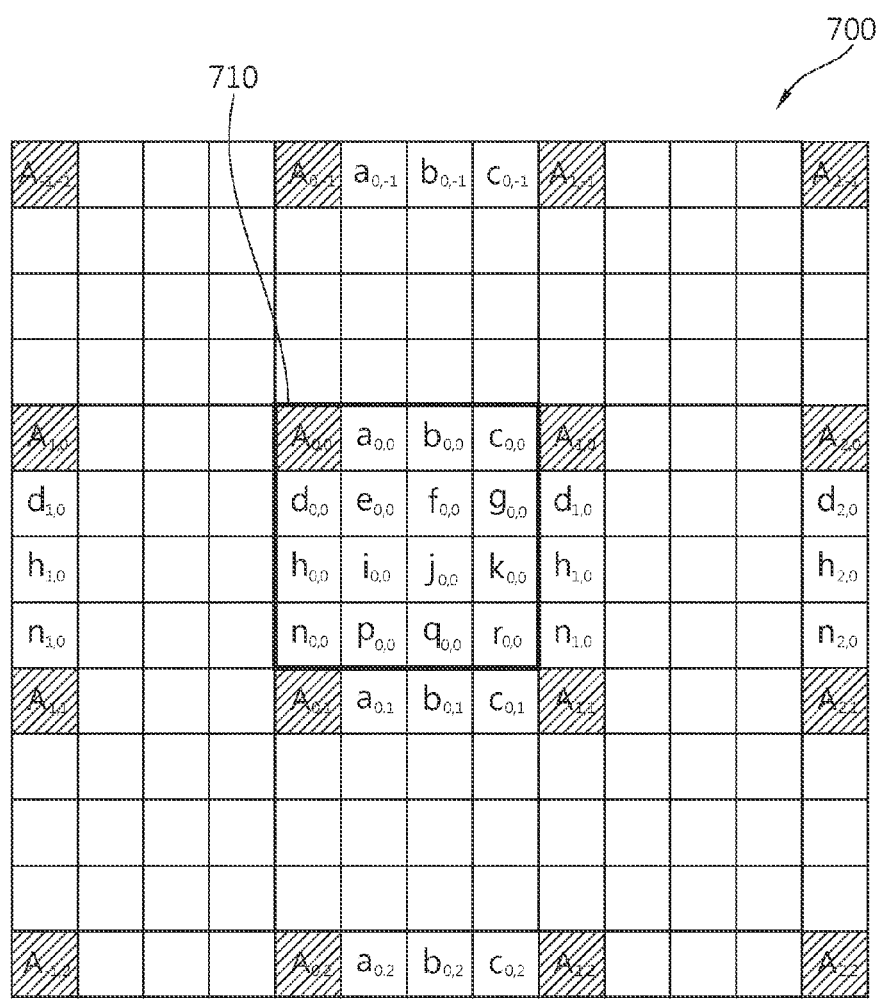
FIG. 7 is a diagram schematically illustrating positions of integer samples and fractional samples for ¼-unit sample interpolation of luma pixels of a reference picture in inter prediction.

FIG. 7 is a diagram schematically illustrating positions of integer samples and fractional samples in ¼-unit sample interpolation of luma pixels in a reference picture in the inter prediction. Out of positions 700 of pixels illustrated in FIG. 7, hatched (indicated by a capital letter) positions correspond to integer samples and non-hatched (indicated by a small letter) correspond fractional samples.

Referring to FIG. 7, fractional pixel samples of ¼ pixel units are generated in an area based on one integer pixel sample by interpolation. Hereinafter, for the purpose of convenience of explanation, an example where fraction pixel samples in an area 710 based on an integer pixel sample $A_{0,0}$ are generated by interpolation will be described.

Table 1 shows an example of coefficients depending on pixel positions in a filter which is applied to generate pixel information less than an integer pixel unit of luma pixels.

TABLE 1

| Pixel position | Filter coefficient |
|---|---|
| 1/4 | {-1, 4, -10, 57, 19, -7, 3, -1} |
| 2/4 | {-1, 4, -11, 40, 40, -11, 4, -1} |
| 3/4 | {-1, 3, -7, 19, 57, -10, 4, -1} |

Referring to Table 1, samples $a_{0,0}$, $b_{0,0}$, $c_{0,0}$, $d_{0,0}$, $h_{0,0}$, and $n_{0,0}$ of ¼ pixel units in FIG. 7 may be calculated by Expression 1 by applying 8-tap filters to the close integer samples and performing a clip operation on the filtered values.

$$a_{0,0} = \text{Clip3}(0, (1<<14)-1, (-A_{-3,0}+4*A_{-2,0}-10*A_{-1,0}+57*A_{0,0}+19*A_{1,0}-7*A_{2,0}+3*A_{3,0}-A_{4,0}+\text{offset1}) >> \text{shift1})$$

$$b_{0,0} = \text{Clip3}(0, (1<<14)-1, (-A_{-3,0}4*A_{-2,0}-11*A_{-1,0}+40*A_{0,0}+40*A_{1,0}-11*A_{2,0}+4*A_{3,0}-A_{4,0}+\text{offset1}) >> \text{shift1})$$

$$c_{0,0} = \text{Clip3}(0, (1<<14)-1, (-A_{-3,0}+3*A_{-2,0}-7*A_{-1,0}+19*A_{0,0}+57*A_{1,0}-10*A_{2,0}+4*A_{3,0}-A_{4,0}+\text{Offset1}) >> \text{shift1})$$

$$d_{0,0} = \text{Clip3}(0, (1<<14)-1, (-A_{0,-3}+4*A_{0,-2}-10*A_{0,-1}+57*A_{0,0}+19*A_{0,1}-7*A_{0,2}+3*A_{0,3}-A_{0,4}+\text{Offset1}) >> \text{shift1})$$

$h_{0,0}$=Clip3(0,(1<<14)−1,(−$A_{0,-3}$+4*$A_{0,-2}$−11*$A_{0,-1}$+ 40*$A_{0,0}$+40*$A_{0,1}$−11*$A_{0,2}$+4*$A_{0,3}$−$A_{0,4}$+ Offset1)>> shift1)

$n_{0,0}$=Clip3(0,(1<<14)−1,(−$A_{0,-3}$+3*$A_{0,-2}$−7*$A_{0,-1}$+ 19*$A_{0,0}$+57*$A_{0,1}$−10*$A_{0,2}$+4*$A_{0,3}$−$A_{0,4}$+ Offset1)>>shift1)  Expression 1

Here, the clip operation is defined as Expression 2.

$$Clip3(x, y, z) = \begin{cases} x & ; \quad z < x \\ y & ; \quad z > y \\ z & ; \quad \text{otherwise} \end{cases}$$  Expression 2

Here, "x<<y" represents that an expression of two's complement integer of x is arithmetically shifted to the left by a binary unit y, and "x>>y" represents that an example of two's complement integer of x is arithmetically shifted to the right by a binary unit y. In addition, shift1 is defined as BitDepth$_Y$-8 and specifies a bit depth of a sample in a luma pixel array. Offset1 is set to 0 when the value of shift1 is 0, and is set to 1<<(shift1−1) otherwise.

Samples $e_{0,0}$, $f_{0,0}$, $g_{0,0}$, $i_{0,0}$, $j_{0,0}$, $k_{0,0}$, $p_{0,0}$, $q_{0,0}$, and $r_{0,0}$ of ¼ pixel units in FIG. 7 may be calculated by Expression 3 by applying 8-tap filters.

$e_{0,0}$=Clip3(0,(1<<14)−1,(−$d1_{-3,0}$+4*$d1_{-2,0}$− 10*$d1_{-1,0}$+57*$d1_{0,0}$+19*$d1_{1,0}$−7*$d1_{2,0}$+ 3*$d1_{3,0}$−$d1_{4,0}$+offset2)>>shift2)

$f_{0,0}$=Clip3(0,(1<<14)−1,(−$d1_{-3,0}$+4*$d1_{-2,0}$−11* $d1_{-1,0}$+40*$d1_{0,0}$+40*$d1_{1,0}$−11*$d1_{2,0}$+4*$d1_{3,0}$− $d1_{4,0}$+offset2)>>shift2)

$g_{0,0}$=Clip3(0,(1<<14)−1,(−$d1_{-3,0}$+3*$d1_{-2,0}$−7*$d1_{-1,0}$+ 19*$d1_{0,0}$+57*$d1_{1,0}$−10*$d1_{2,0}$+4*$d1_{3,0}$−$d1_{4,0}$+ offset2)>>shift2)

$i_{0,0}$=Clip3(0,(1<<14)−1,(−$h1_{-3,0}$+4*$h1_{-2,0}$− 10*$h1_{-1,0}$+19*$h1_{0,0}$+19*$h1_{1,0}$−7*$h1_{2,0}$+3*$h1_{3,0}$− $h1_{4,0}$+offset2)>>shift2)

$j_{0,0}$=Clip3(0,(1<<14)−1,(−$h1_{-3,0}$+4*$h1_{-2,0}$− 11*$h1_{-1,0}$+40*$h1_{0,0}$+40*$h1_{1,0}$− 11*$h1_{2,0}$+ 4*$h1_{3,0}$−$h1_{4,0}$+offset2)>>shift2)

$k_{0,0}$=Clip3(0,(1<<14)−1,(−$h1_{-3,0}$+3*$h1_{-2,0}$−7*$h1_{-1,0}$+ 19*$h1_{0,0}$+57*$h1_{1,0}$−10*$h1_{2,0}$+4*$h1_{3,0}$−$h1_{4,0}$+ offset2)>>shift2)

$p_{0,0}$=Clip3(0,(1<<14)−1,(−$n1_{-3,0}$+4*$n1_{-2,0}$− 10*$n1_{-1,0}$+57*$n1_{0,0}$+19*$n1_{1,0}$−7*$n1_{2,0}$+ 3*$n1_{3,0}$−$n1_{4,0}$+offset2)>>shift2)

$q_{0,0}$=Clip3(0,(1<<14)−1,(−$n1_{-3,0}$+4*$n1_{-2,0}$−11* $n1_{-1,0}$+40*$n1_{0,0}$+40*$n1_{1,0}$−11*$n1_{2,0}$+4*$n1_{3,0}$− $n1_{4,0}$+offset2)>>shift2)

$r_{0,0}$=Clip3(0,(1<<14)−1,(−$n1_{-3,0}$+3*$n1_{-2,0}$−7*$n1_{-1,0}$+ 19*$n1_{0,0}$+57*$n1_{1,0}$−10*$n1_{2,0}$+4*$n1_{3,0}$−$n1_{4,0}$+ offset2)>>shift2)  Expression 3

Here, shift2 is defined as BitDepth$_Y$-2 and offset2 is set to 1<<(shift2−1). Intermediate values $d1_{i,0}$, $h1_{i,0}$, and $n1_{i,0}$ illustrated in FIG. 7 can be calculated by Expression 4.

$d1_{i,0}$=−$A_{i,-3}$4*$A_{i,-2}$−10*$A_{i,-1}$57*$A_{i,0}$+19*$A_{i,1}$−7*$A_{i,2}$+ 3*$A_{i,3}$−$A_{i,4}$ $h1_{i,0}$=−$A_{i,-3}$4*$A_{i,-2}$−11*$A_{i,-1}$40*$A_{i,0}$+40*$A_{i,1}$− 11*$A_{i,2}$+4*$A_{i,3}$−$A_{i,4}$ $n1_{i,0}$=−$A_{i,-3}$3*$A_{i,-2}$−7*$A_{i,-1}$19*$A_{i,0}$+57*$A_{i,1}$−10*$A_{i,2}$+ 4*$A_{i,3}$−$A_{i,4}$  Expression 4

Figure 15:
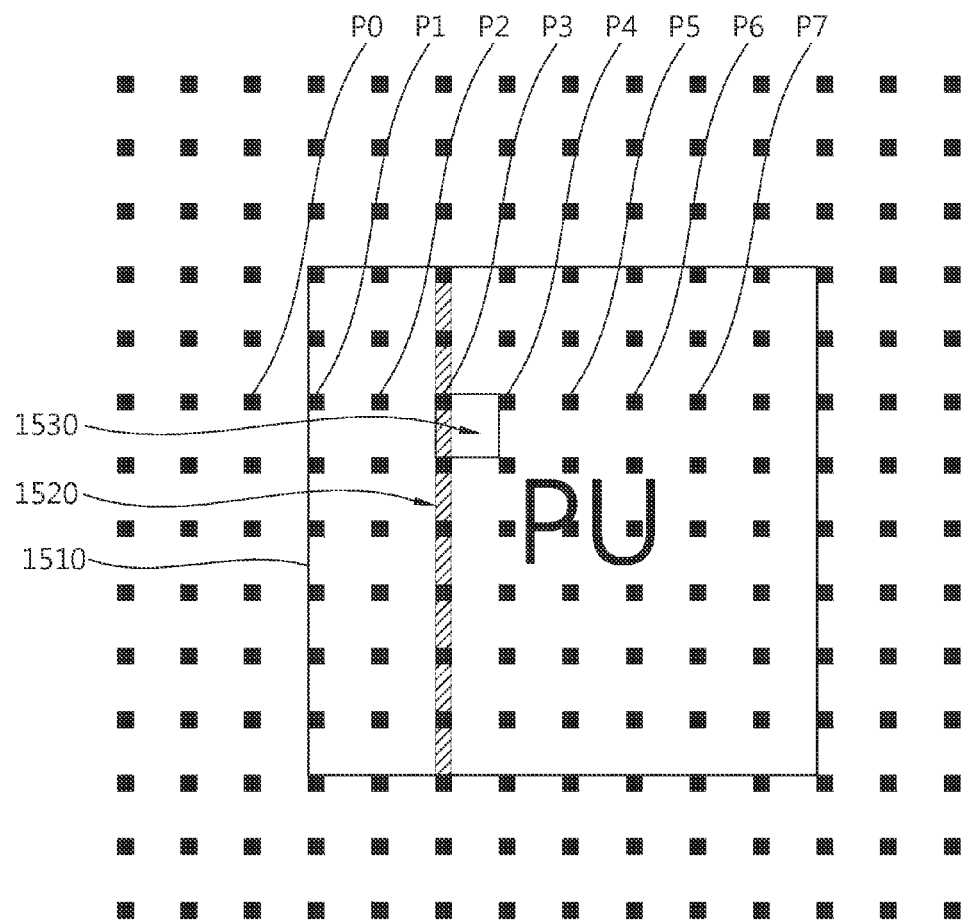

Here, i has a value of −3, . . . , 4 in the horizontal direction, and $A_{i,j}$ represents an integer sample located in row i and column j in an integer sample array illustrated in FIG. 15.

In Expressions 1, 3, and 4, coefficients of {−1, 4, −10, 57, 19, −7, 3, −1} are applied to samples at ¼ pixel positions, coefficients of {−1, 4, −11, 40, 40, −11, 4, −1} are applied to samples at 2/4 sample positions, and coefficients of {−1, 3, −7, 19, 57, −10, 4, −1} are applied to samples at ¾ pixel positions as shown in Table 1.

The method of calculating fractional samples in an area adjacent to the integer position sample $A_{0,0}$ may be similarly applied to calculation of fractional samples of ¼ pixel units located in an area adjacent to another integer sample $A_{i,j}$.

A method of calculating a position of a pixel sample will be described below. A position (x$A_{i,j}$, y$A_{i,j}$) corresponding to each luma sample $A_{i,j}$ in a reference picture sample array for luma pixels is expressed by Expression 5.

x$A_{i,j}$=Clip3(0,PicWidthInSamples$_L$1,xInt$_L$+i)

y$A_{i,j}$=Clip3(0,PicHeightInSamples$_L$1,yInt$_L$+j)  Expression 5

Here, PicWidthInSamples$_L$ specifies the width of a reference picture sample array for luma pixels, and PicHeightInSamples$_L$ specifies the height of the reference picture sample array for luma pixels. (xInt$_L$, yInt$_L$) represents a position of a luma pixel expressed by full sample units. (xFrac$_L$, yFrac$_L$) represents a position of a luma pixel expressed by fractional sample units. (xInt$_L$, yInt$_L$) and (xFrac$_L$, yFrac$_L$) may be calculated as follows.

xInt$_L$=xP+(mvLX[0]>>2)+$x_L$ yInt$_L$=yP+(mvLX[1]>>2)+$y_L$  Expression 6 xFrac$_L$=mvLX[0]&3 yFrac$_L$=mvLX[1]&3  Expression 7

Here, xP=xC+xB and yP=yC+yB are established. (xC, yC) specifies a position of a luma pixel sample at the top-left corner of a current coding unit relative to a luma pixel sample at a top-left corner of a current picture, and (xB, yB) specifies a position of a luma pixel sample at the top-left corner of a current prediction unit relative to the luma pixel sample at the top-left corner of the current coding unit. (xP, yP) represents a position of a luma pixel sample on the upper-left side of the current prediction unit relative to a position of a luma pixel sample on the upper-left side of the reference sample array.

In addition, ($x_L$, $y_L$) represents a position of a luma sample in a predicted luma sample array, mvLX represents a motion vector of a luma pixel, and "&" represents a bitwise AND operator.

An offset (xFrac$_L$, yFrac$_L$) indicating a luma pixel position of a fractional sample unit specifies a pixel sample generated at what fractional sample position is allocated to the predicted luma sample value based on interpolation. Table 2 shows an example of allocation of a luma pixel position offset and a predicted luma sample value of a fractional sample unit.

TABLE 2

| xFracL | 0 | 0 | 0 | 0 | 1 | 1 | 1 | 1 | 2 | 2 | 2 | 2 | 3 | 3 | 3 | 3 |
|---|---|---|---|---|---|---|---|---|---|---|---|---|---|---|---|---|
| yFracL | 0 | 1 | 2 | 3 | 0 | 1 | 2 | 3 | 0 | 1 | 2 | 3 | 0 | 1 | 2 | 3 |

TABLE 2-continued

| Predicted sample value | A<<shift3 | d | h | n | a | e | i | p | b | f | j | q | c | g | k | r |
|---|---|---|---|---|---|---|---|---|---|---|---|---|---|---|---|---|

Here, shift3 is set to 14-BitDepth$_y$. Therefore, according to the above-mentioned interpolation method, the predicted luma sample values shown in Table 2 may be acquired on the basis of pixel positions of given full sample units, pixel positions of fractional sample units, and a reference sample array.

Unlike the luma pixels, in case of chroma pixels, the resolution of a motion vector is ⅛ samples, and pixel information less than an integer pixel may be generated by ⅛ pixel units through the use of interpolation. In order to perform the interpolation process on chroma pixels, DCT-based 4-tap interpolation filters (DCT-based Interpolation Filters) having different filter coefficients may be used.

Figure 8:
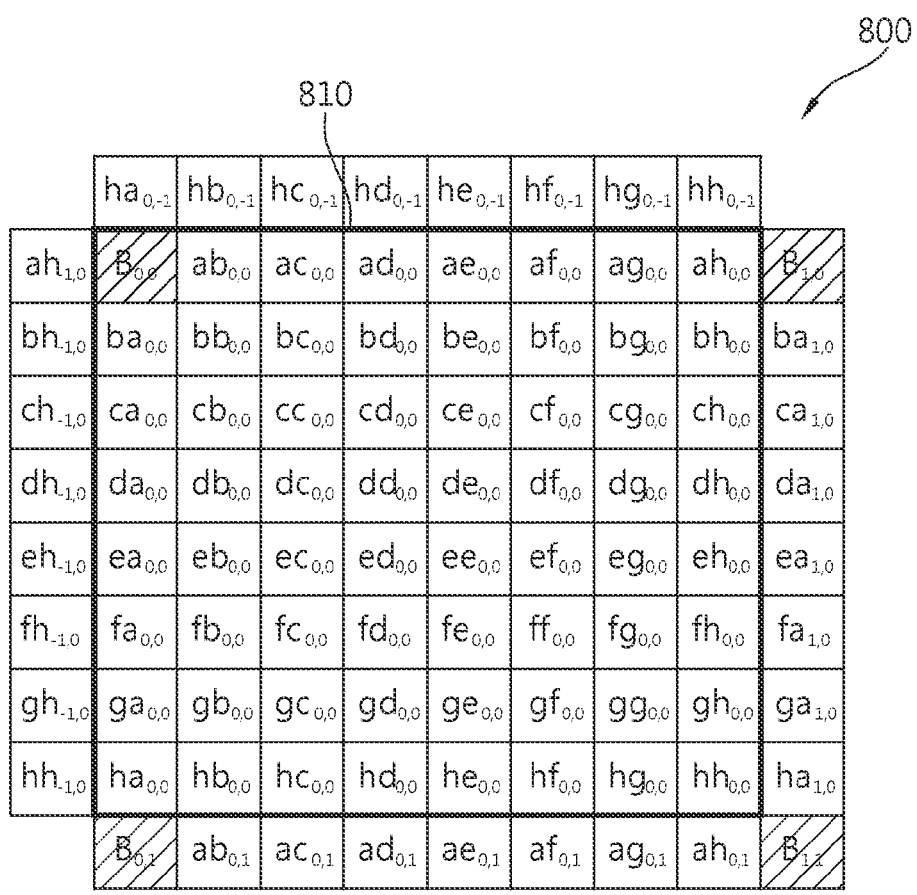
FIG. 8 is a diagram schematically illustrating positions of integer samples and fractional samples for ⅛-unit sample interpolation of chroma pixels.

FIG. 8 is a diagram schematically illustrating positions of integer samples and fractional samples in ⅛-unit sample interpolation of chroma pixels. Out of positions 800 of pixels illustrated in FIG. 8, hatched (indicated by capital letters) positions correspond to integer samples and non-hatched (indicated by small letters) positions correspond to fractional samples.

Referring to FIG. 8, similarly to FIG. 7, fractional pixel samples, specifically, fractional pixel samples of ⅛ pixel units, are generated in an area based on one integer pixel sample by interpolation. Hereinafter, for the purpose of convenience of explanation, an example where fraction pixel samples in an area 810 based on an integer pixel sample $B_{0,0}$ are generated by interpolation will be described.

Table 3 shows an example of filter coefficients depending on pixel positions for generating pixel information less than an integer pixel unit of chroma pixels.

TABLE 3

| Pixel position | Filter coefficient |
|---|---|
| 1/8 | {−3, 60, 8, −1} |
| 2/8 | {−4, 54, 16, −2} |
| 3/8 | {−5, 46, 27, −4} |
| 4/8 | {−4, 36, 36, −4} |
| 5/8 | {−4, 27, 46, −5} |
| 6/8 | {−2, 16, 54, −4} |
| 7/8 | {−1, 8, 60, −3} |

Referring to Table 3, samples $ab_{0,0}$, $ac_{0,0}$, $ad_{0,0}$, $ae_{0,0}$, $af_{0,0}$, $ag_{0,0}$, and $ah_{0,0}$ of ⅛ pixel units in FIG. 8 may be calculated by Expression 8 by applying 4-tap filters to the close integer samples and performing a clip operation on the filtered values.

$ab_{0,0}$=Clip3(0,(1<<14)−1,(−3*$B_{−1,0}$+60*$B_{0,0}$+8*$B_{1,0}$−$B_{2,0}$+offset1)>>shift1)

$ac_{0,0}$=Clip3(0,(1<<14)−1,(−4*$B_{−1,0}$+54*$B_{0,0}$+16*$B_{1,0}$−2*$B_{2,0}$+offset1)>>shift1)

$ad_{0,0}$=Clip3(0,(1<<14)−1,(−5*$B_{−1,0}$+46*$B_{0,0}$+27*$B_{1,0}$−4*$B_{2,0}$+offset1)>>shift1)

$ae_{0,0}$=Clip3(0,(1<<14)−1,(−4*$B_{−1,0}$+36*$B_{0,0}$+36*$B_{1,0}$−4*$B_{2,0}$+offset1)>>shift1)

$af_{0,0}$=Clip3(0,(1<<14)−1,(−4*$B_{−1,0}$+27*$B_{0,0}$+46*$B_{1,0}$−5*$B_{2,0}$+offset1)>>shift1)

$ag_{0,0}$=Clip3(0,(1<<14)−1,(−2*$B_{−1,0}$+16*$B_{0,0}$+54*$B_{1,0}$−4*$B_{2,0}$+offset1)>>shift1)

$ah_{0,0}$=Clip3(0,(1<<14)−1,(−$B_{−1,0}$+8*$B_{0,0}$+60*$B_{1,0}$−3*$B_{2,0}$+offset1)>>shift1)   Expression 8

In addition, samples $ba_{0,0}$, $ca_{0,0}$, $da_{0,0}$, $ea_{0,0}$, $fa_{0,0}$, $ga_{0,0}$, and $ha_{0,0}$ of ⅛ pixel units in FIG. 8 may be calculated by Expression 9 by applying 4-tap filters to the close integer samples and performing a clip operation on the filtered values.

$ba_{0,0}$=Clip3(0,(1<<14)−1,(−3*$B_{0,−1}$+60*$B_{0,0}$+8*$B_{0,1}$−$B_{0,2}$+offset1)>>shift1)

$ca_{0,0}$=Clip3(0,(1<<14)−1,(−4*$B_{0,−1}$+54*$B_{0,0}$+16*$B_{0,1}$−2*$B_{0,2}$+offset1)>>shift1)

$da_{0,0}$=Clip3(0,(1<<14)−1,(−5*$B_{0,−1}$+46*$B_{0,0}$+27*$B_{0,1}$−4*$B_{0,2}$+offset1)>>shift1)

$ea_{0,0}$=Clip3(0,(1<<14)−1,(−4*$B_{0,−1}$+36*$B_{0,0}$+36*$B_{0,1}$−4*$B_{0,2}$+offset1)>>shift1)

$fa_{0,0}$=Clip3(0,(1<<14)−1,(−4*$B_{0,−1}$+27*$B_{0,0}$+46*$B_{0,1}$−5*$B_{0,2}$+offset1)>>shift1)

$ga_{0,0}$=Clip3(0,(1<<14)−1,(−2*$B_{0,−1}$+16*$B_{0,0}$+54*$B_{0,1}$−4*$B_{0,2}$+offset1)>>shift1)

$ha_{0,0}$=Clip3(0,(1<<14)−1,(−$B_{0,−1}$+8*$B_{0,0}$+60*$B_{0,1}$−3*$B_{0,2}$+offset1)>>shift1)   Expression 9

Samples $Xb_{0,0}$, $Xc_{0,0}$, $Xd_{0,0}$, $Xe_{0,0}$, $Xf_{0,0}$, $Xg_{0,0}$, and $Xh_{0,0}$ (where X is b, c, d, e, f, g, or h) of ⅛ pixel units may be acquired by calculating the intermediate values $ba_{i,0}$, $ca_{i,0}$, $da_{i,0}$, $ea_{i,0}$, $fa_{i,0}$, $ga_{i,0}$, and $ha_{i,0}$ (where i is −1, . . . , 2 in the horizontal direction) using Expression 10 and applying 4-tap filters to the close integer-positioned samples.

$ba_{i,0}$=−3*$B_{0,−1}$+60*$B_{0,0}$+8*$B_{0,1}$−$B_{0,2}$ $ca_{i,0}$=−4*$B_{0,−1}$+54*$B_{0,0}$+16*$B_{0,1}$−2*$B_{0,2}$ $da_{i,0}$=−5*$B_{0,−1}$+46*$B_{0,0}$+27*$B_{0,1}$−4*$B_{0,2}$ $ea_{i,0}$=−4*$B_{0,−1}$+36*$B_{0,0}$+36*$B_{0,1}$−4*$B_{0,2}$ $fa_{i,0}$=−4*$B_{0,−1}$+27*$B_{0,0}$+46*$B_{0,1}$−5*$B_{0,2}$ $ga_{i,0}$=−2*$B_{0,−1}$+16*$B_{0,0}$+54*$B_{0,1}$−4*$B_{0,2}$ $ha_{i,0}$=−$B_{0,−1}$+8*$B_{0,0}$+60*$B_{0,1}$−3*$B_{0,2}$   Expression 10

$Xb_{0,0}$, $Xc_{0,0}$, $Xd_{0,0}$, $Xe_{0,0}$, $Xf_{0,0}$, $Xg_{0,0}$, and $Xh_{0,0}$ (where X is b, c, d, e, f, g, or h) may be calculated by Expression 11 by applying 4-tap filters to the intermediate value $Xa_{i,0}$ (where i is −1, . . . , 2 in the horizontal direction).

$Xb_{0,0}$=Clip3(0,(1<<14)−1,(−3*$Xa_{−1,0}$+60*$Xa_{0,0}$+8*$Xa_{1,0}$−$Xa_{2,0}$+offset2)>>shift2)

$Xc_{0,0}$=Clip3(0,(1<<14)−1,(−4*$Xa_{−1,0}$+54*$Xa_{0,0}$+16*$Xa_{1,0}$−2*$Xa_{2,0}$+offset2)>>shift2)

$Xd_{0,0}$=Clip3(0,(1<<14)−1,(−5*$Xa_{−1,0}$+46*$Xa_{0,0}$+26*$Xa_{1,0}$−4*$Xa_{2,0}$+offset2)>>shift2)

$Xe_{0,0}$=Clip3(0,(1<<14)−1,(−4*$Xa_{−1,0}$+36*$Xa_{0,0}$+36*$Xa_{1,0}$−4*$Xa_{2,0}$+offset2)>>shift2)

$Xf_{0,0}=\text{Clip3}(0,(1<<14)-1,(-4*Xa_{-1,0}+27*Xa_{0,0}+46*Xa_{1,0}-5*Xa_{2,0}+\text{offset2})>>\text{shift2})$ $Xg_{0,0}=\text{Clip3}(0,(1<<14)-1,(-2*Xa_{-1,0}+16*Xa_{0,0}+54*Xa_{1,0}-4*Xa_{2,0}+\text{offset2})>>\text{shift2})$ $Xh_{0,0}=\text{Clip3}(0,(1<<14)-1,(-Xa_{-1,0}+8*Xa_{0,0}+60*Xa_{1,0}-3*Xa_{2,0}+\text{offset2})>>\text{shift2})$   Expression 11

In Expressions 8 to 11, coefficients of {−3, 60, 8, −1} are applied to samples at ⅛ pixel positions, coefficients of {−4, 54, 16, −2} are applied to samples at 2/8 sample positions, coefficients of {−5, 46, 27, −4} are applied to samples at 3/8 pixel positions, coefficients of {−4, 36, 36, −4} are applied to samples at 4/8 pixel positions, coefficients of {−4, 27, 46, −5} are applied to samples at 5/8 pixel positions, coefficients of {−2, 16, 54, −4} are applied to samples at 6/8 pixel positions, and coefficients of {−1, 8, 60, −3} are applied to samples at 3/8 pixel positions as shown in Table 3.

In order to calculate a motion vector, it is necessary to calculate the positions of integer samples and fractional samples even for chroma pixels. The positions $(xB_{i,j}, yB_{i,j})$ corresponding to the chroma samples $B_i$, in a reference picture sample array for chroma pixels are expressed by Expression 12.

$xB_{i,j}=\text{Clip3}(0,\text{PicWidthInSamples}_C-1,x\text{Int}_C+i)$ $yB_{i,j}=\text{Clip3}(0,\text{PicHeightInSamples}_C-1,y\text{Int}_C+j)$   Expression 12

Here, PicWidthInSamples$_C$ specifies the width of a reference picture sample array for chroma pixels, and PicHeightInSamples$_C$ specifies the height of the reference picture sample array for chroma pixels. $(x\text{Int}_C, y\text{Int}_C)$ represents a position of a luma pixel expressed by full sample units. $(x\text{Frac}_C, y\text{Frac}_C)$ represents a position of a chroma pixel expressed by fractional sample units. $(x\text{Int}_C, y\text{Int}_C)$ and $(x\text{Frac}_C, y\text{Frac}_C)$ may be calculated as follows.

$x\text{Int}_C=(xP/2)+(mvCLX[0]>>3)+x_C$ $y\text{Int}_C=(yP/2)+(mvCLX[1]>>3)+y_C$   Expression 13

$x\text{Frac}_C=mvLX[0]\&7$ $y\text{Frac}_C=mvLX[1]\&7$   Expression 14

Here, $(x_C, y_C)$ represents a position of a chroma pixel in the predicted chroma sample array, and mvCLX is a motion vector of the chroma pixel.

An offset $(x\text{Frac}_C, y\text{Frac}_C)$ indicating a chroma pixel position of a fractional sample unit specifies a chroma sample generated at what full sample and fractional sample position is allocated to the predicted chroma sample value based on interpolation. Table 4 shows an example of allocation of a chroma pixel position offset and a predicted chroma sample value of a fractional sample unit.

dicted block and calculating a motion vector using pixel positions corresponding to the predicted sample values generated by interpolation, it is possible to enhance prediction performance.

On the other hand, when the predicted block and the motion vector for inter prediction are generated by interpolation as described above, it may be considered that the interpolation is performed using together the pixel samples of a reference picture and the pixel samples of a current picture without using only the pixel samples of the reference picture. It is possible to generate a predicted block more similar to the current block by performing the interpolation process using the pixel samples of the current picture.

Figure 9:
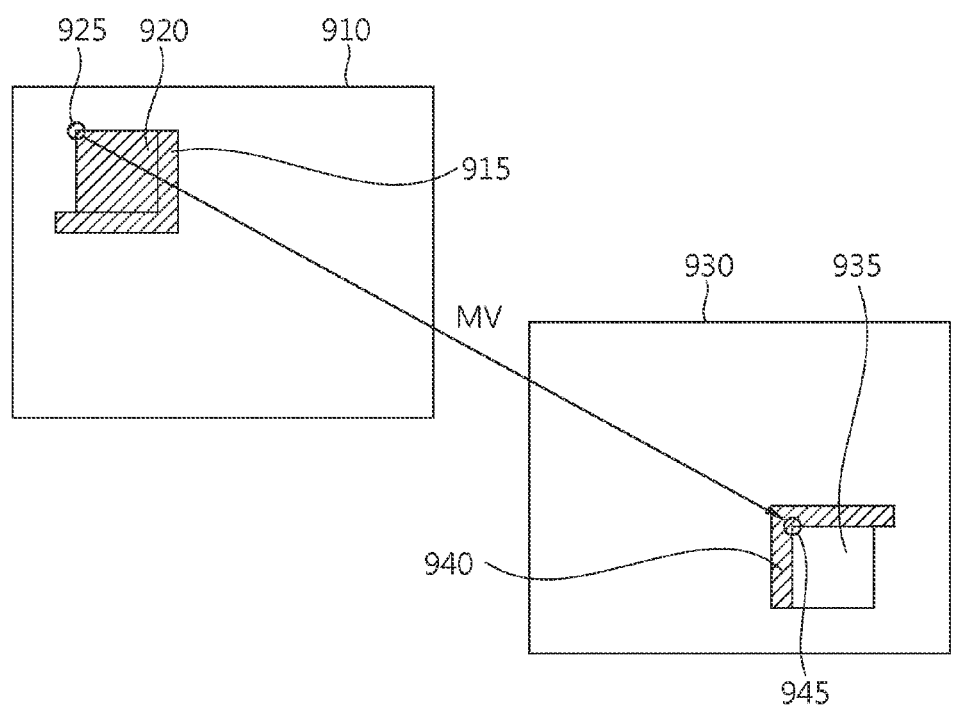
FIG. 9 is a diagram schematically illustrating an example where interpolation is performed using samples of a reference picture and a current picture together according to an embodiment of the present invention.

FIG. 9 is a diagram schematically illustrating an example where the interpolation process is performed using together the reference picture and the current picture according to the present invention.

In FIG. 9, the difference in position between a prediction unit 935 and a reference block 920 may be expressed by a motion vector MV. Referring to FIG. 9, in order to generate a predicted block of the prediction unit 935 of a current picture 930, the interpolation process for inter prediction may be performed on the basis of the reference block 920 of a reference picture 910 corresponding to the prediction unit 935, a pixel area 915 around the reference block 920, and a reconstructed pixel area 940 around the prediction unit 935 in the current picture 930. Fractional sample less than an integer unit, for example, ½ pixels or ¼ pixels, may be generated by the use of the interpolation.

Figure 10:
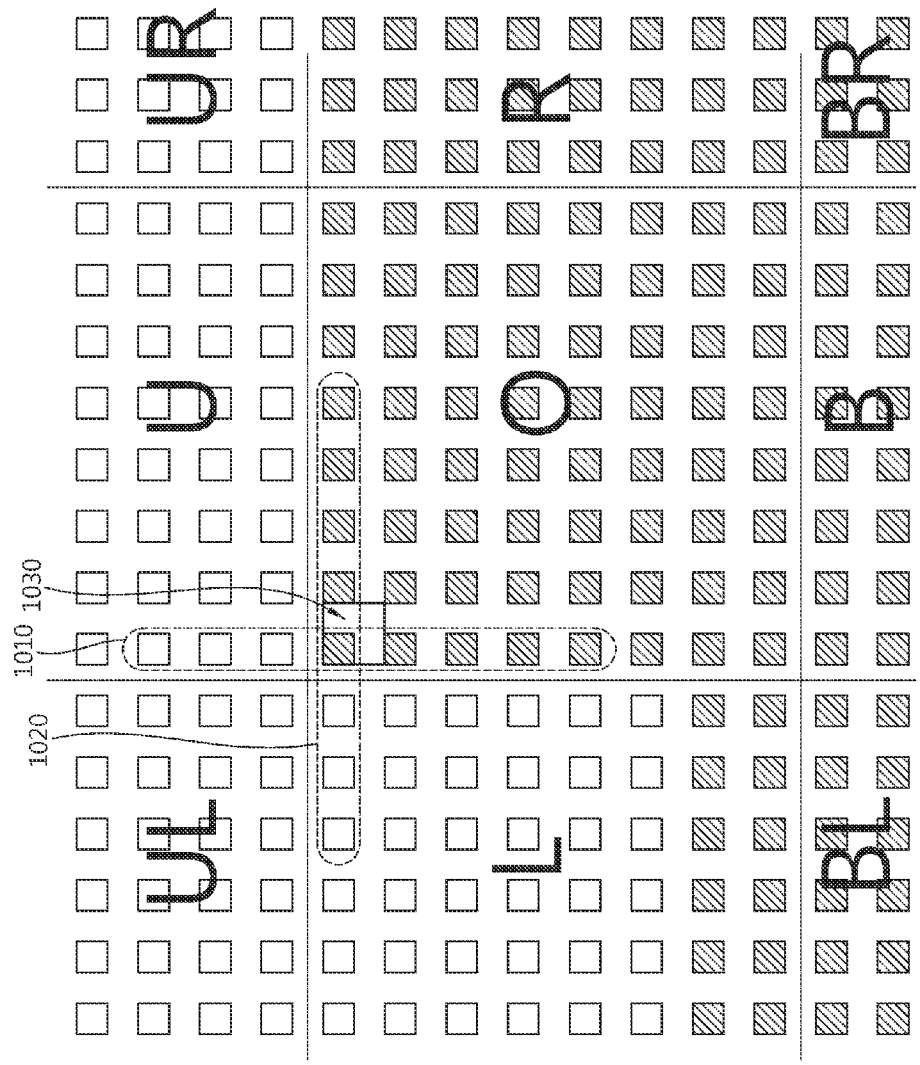
FIG. 10 is a diagram schematically illustrating a sample array for interpolation including pixels of a reconstructed current picture and pixel samples of a reference picture.

FIG. 10 is a diagram schematically illustrating a sample array for interpolation including pixels of a reconstructed current picture and pixel samples of a reference picture. FIG. 10 illustrates an example where a prediction unit is an 8×8 block.

Referring to FIG. 10, pixel samples (hatched) of a reference target block O and a right block R, a bottom-left block BL, a bottom block, and bottom-right block BR of the reference target block are integer samples of a reference picture, and pixel samples (non-hatched) of a left block L, an upper-left block, an upper block U, and an upper-right block UR of the reference target block are reconstructed integer samples of a current picture.

Hereinafter, for the purpose of convenience of explanation, an area in which fractional samples are generated by interpolation, for example, the area 710 in FIG. 7 and the area 810 in FIG. 8, is referred to as an interpolation area. Integer pixel samples in the interpolation area, for example, integer pixel samples corresponding to A0,0 in FIG. 7 and B0,0 in FIG. 8, are referred to as reference integer samples. Therefore, the fractional pixel samples in the corresponding interpolation area of a given reference integer sample may be generated by interpolation.

TABLE 4

| xFracC | 0 | 0 | 0 | 0 | 0 | 0 | 0 | 0 | X | X | X | X | X | X | X | X |
|---|---|---|---|---|---|---|---|---|---|---|---|---|---|---|---|---|
| yFracC | 0 | 1 | 2 | 3 | 4 | 5 | 6 | 7 | 0 | 1 | 2 | 3 | 4 | 5 | 6 | 7 |
| Predicted sample value | B<<shift3 | ba | ca | da | ea | fa | ga | ha | aY | bY | cY | dY | eY | fY | gY | bY |

Here, shift3 is set to 14-BitDepth$_y$. (X, Y) may be replaced with (1, b), (2, c), (3, d), (4, e), (5, f), (6, g), and (7, h).

According to the above-mentioned interpolation method, the predicted chroma sample values shown in Table 4 may be acquired on the basis of pixel positions of given full sample units, pixel positions of fractional sample units, and a reference sample array. In this way, by selecting a pre- As described above, in the present invention, the interpolation is performed using together the reconstructed integer pixel samples of the current picture and the integer pixel samples of the reference picture. For example, when it is assumed that FIG. 10 illustrates an array of luma pixel samples, the fractional pixel samples may be generated using am 8-tap interpolation filter. Referring to Expression 1, the maximum three integer pixel samples out of the integer pixel samples of the current picture may be included in the integer pixel samples 1010 and 1020 to which the interpolation filter is applied.

Therefore, in case of luma pixels, the reconstructed integer pixel samples of the current picture may be used to perform the interpolation using any one of three integer pixel samples closest to the block boundary of the reference block O as a reference integer sample. That is, in case of luma pixels, the maximum number of integer pixel samples of the current picture which can be used for interpolation of generating the fractional pixel samples of the reference block is 3.

In case of chroma pixels, since a 4-tap interpolation filter can be used to generate fractional samples, the number of integer pixel samples of the current picture which can be used to generate the fraction pixel samples of the reference block is one with reference to Expression 8. That is, in case of chroma pixels, the reconstructed integer pixel samples of the current picture may be used to perform the interpolation using an integer pixel sample closest to the block boundary of the reference block O as a reference integer sample.

Hereinafter, the interpolation method according to the present invention will be described in detail on the basis of the position of the reference integer sample and the positions of the fractional pixel samples generated using the integer pixel samples of the current picture. Common details in the following cases will not be repeated for the purpose of convenience of explanation.

Figure 11:
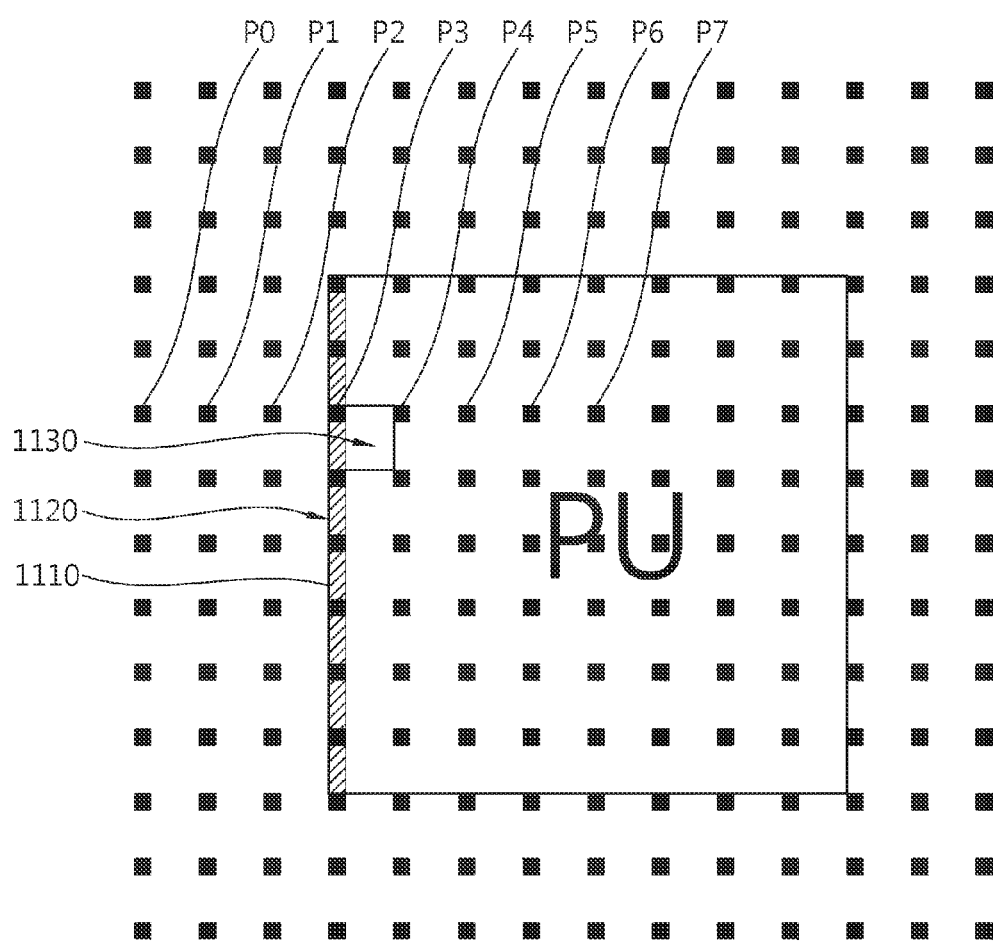
FIG. 11 is a diagram schematically illustrating examples depending on a position of a reference integer sample in a reference block corresponding to a prediction unit.

1. Case where Fractional Pixel Samples a, b, c, and ab are Generated and Reference Integer Sample is Located in First Integer Sample Column of Reference Block FIG. 11 is a diagram schematically illustrating an example where a reference integer sample for generating fractional samples less than an integer unit in a reference block corresponding to a prediction unit 1110 is located in a first integer sample column 1120 from the left boundary of the reference block. In FIG. 11, P0, . . . , P7 represent integer pixels (values), and P0, . . . , P7 may be luma pixels or chroma pixels. In FIG. 11, it is assumed that the prediction unit is an 8×8 block.

Hereinafter, the example illustrated in FIG. 11 will be described in two cases where P0, . . . P7 are luma samples and chroma pixels and then pre-process which can be performed before performing interpolation according to the present invention will be described.

(1) Interpolation of Luma Sample

In case of luma pixels, fractional pixel samples such as $a_{0,0}$ to $r_{0,0}$ in the area 710 illustrated in FIG. 7 are generated in the unit of ¼ pixels by interpolation in the interpolation area 1130.

In case of chroma pixels, an 8-tap interpolation filter may be used. For the purpose of convenience of explanation, it is assumed that eight integer pixels used in the interpolation filter are P0, P1, P2, P3, P4, P5, P6, and P7. Since a reference integer sample P3 is located in the first integer pixel sample column in the reference block, three reconstructed pixel samples of a current picture may be used for the interpolation. Referring to FIG. 11, the integer pixel samples P0, P1, and P2 are used as the reconstructed pixels of the current picture for the interpolation.

Figure 12:
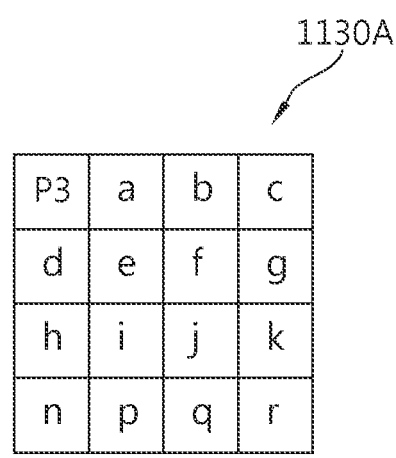
FIG. 12 is a diagram schematically illustrating an interpolation area for luma pixel samples according to an embodiment of the present invention.

FIG. 12 is a diagram illustrating the interpolation area 1130 of FIG. 11 for luma pixel samples and schematically illustrates positional relationships between the fractional pixel samples and the integer pixel samples in the interpolation area 1130A. In this embodiment, the reference integer pixel is P3 and the fractional pixel samples a to r in the interpolation area are generated by interpolation.

Coefficients of the filter used for the interpolation may be determined in various methods. For example, when the filter coefficients used to derive Expression 1 are used, a, b, and c of the fractional pixel samples may be calculated by Expression 15.

$$a=\text{Clip3}(0,(1\!<\!<\!14)-1,(-P0+4P1-10P2+57P3+19P4-7P5+3P6-P7+\text{offset1})\!>\!>\!\text{shift1})$$

$$b=\text{Clip3}(0,(1\!<\!<\!14)-1,(-P0+4P1-11P2+40P3+40P4-11P5+4P6-P7+\text{offset1})\!>\!>\!\text{shift1})$$

$$c=\text{Clip3}(0,(1\!<\!<\!14)-1,(-P0+3P1-7P2+19P3+57P4-10P5+4P6-P7+\text{offset1})\!>\!>\!\text{shift1})$$

Expression 15

On the other hand, when the integer pixel samples located in the third row from the top boundary of the reference block 1110 are used as a reference integer sample, the fractional pixel samples d, h, and n may be generated using the reconstructed integer pixel samples of the current picture. This case will be described later. When the reference integer sample is located within the fourth row from the top boundary of the reference block 1110, the integer pixel samples of the reference picture may be used to calculate the fractional pixel samples. For example, the fractional pixel samples d, h, and n may be generated by applying Expression 1 to the integer pixel samples of the reference picture.

The fractional pixel samples e, f, g, i, j, k, p, q, and r may be calculated using the values of a, b, c, d, h, and n. For example, when the filters expressed by Expressions 3 and 4 are applied, the filters are applied to a, b, c, d, h, and n to calculate the other fractional pixel samples. The positions corresponding to the calculated fractional pixel sample values may be calculated, for example, using Expression 5 and Table 2.

(2) Interpolation of Chroma Sample

In case of chroma pixels, fractional pixel samples such as $ab_{0,0}$ to $hh_{0,0}$ in the area 810 illustrated in FIG. 8 are generated in the unit of ⅛ pixels by interpolation in the interpolation area 1130.

In case of chroma samples, a 4-tap interpolation filter may be used. In this case, unlike the case of luma pixels, the interpolation is performed on the chroma pixels using four integer pixels P2, P3, P4, and P5. Since the reference integer pixel P3 is located in the first integer sample column, one of the reconstructed pixel samples of the current picture is used for the interpolation.

FIG. 13 is a diagram illustrating the interpolation area 1130 of FIG. 11 for chroma pixel samples and schematically illustrates positional relationships between the fractional pixel samples and the integer pixel samples in an interpolation area 1130B. As illustrated in the drawing, the reference integer pixel is P3 and the fractional pixel samples ab to hh in the interpolation area are generated by interpolation.

Coefficients of the filter used for the interpolation may be determined in various methods. For example, when the filter coefficients used to derive Expression 8 are used, ab, ac, ad, ae, af, ag, and ah of the fractional pixel samples may be calculated by Expression 16.

$$ab=\text{Clip3}(0,(1\!<\!<\!14)-1,(-3P2+60P3+8P4-P5+\text{offset1})\!>\!>\!\text{shift1})$$

$$ac=\text{Clip3}(0,(1\!<\!<\!14)-1,(-4P2+54P3+16P4-2P5+\text{offset1})\!>\!>\!\text{shift1})$$

$$ad=\text{Clip3}(0,(1\!<\!<\!14)-1,(-5P2+46P3+27P4-4P5+\text{offset1})\!>\!>\!\text{shift1})$$

$$ae = \text{Clip3}(0, (1<<14)-1, (-4P2+36P3+36P4-4P5+\text{offset1})>>\text{shift1})$$

$$af = \text{Clip3}(0, (1<<14)-1, (-4P2+27P3+46P4-5P5+\text{offset1})>>\text{shift1})$$

$$ag = \text{Clip3}(0, (1<<14)-1, (-2P2+16P3+54P4-4P5+\text{offset1})>>\text{shift1})$$

$$ah = \text{Clip3}(0, (1<<14)-1, (-P2+8P3+60P4-3P5+\text{offset1})>>\text{shift1}) \quad \text{Expression 16}$$

On the other hand, when the integer pixel samples located in the first row from the top boundary of the reference block 1110 are used as a reference integer sample, the fractional pixel samples ba, ca, da, ea, fa, ga, and ha may be generated using the reconstructed integer pixel samples of the current picture. This case will be described later. When the reference integer sample is located within the second row from the top boundary of the reference block 1110, the integer pixel samples of the reference picture may be used to calculate the fractional pixel samples ba, ca, da, ea, fa, ga, and ha, for example, using Expression 9.

The other fractional pixel samples in the reference block 1110 may be calculated using the values of ab, ac, ad, ae, af, ag, ah, ba, ca, da, ea, fa, ga, ha. For example, when the filters expressed by Expressions 10 and 11 are used, the filters may be applied to the above-mentioned values to calculate the other fractional pixel samples. The positions corresponding to the calculated fractional pixel sample values may be calculated, for example, using Expression 14 and Table 4.

(3) Pre-Process—Smoothing on Reconstructed Integer Samples of Current Picture

In order to reduce discontinuity generated in the block boundary, a predetermined pre-process such as a smoothing process may be performed on the integer samples of the current picture used for the interpolation.

The target of the smoothing as a pre-process of the interpolation is the reconstructed integer pixel samples to be used for the interpolation. The smoothing process may be performed on all the reconstructed integer pixel samples (P0, P1, and P2 in FIG. 19) of the current picture to be used for the interpolation. The smoothing process may be performed on a predetermined number of integer pixel samples depending on the distance from the block boundary out of the reconstructed integer pixel samples of the current picture to be used for the interpolation. For example, the smoothing process may be performed on only the integer pixel sample (P2 in FIG. 11) closest to the block boundary or the smoothing process may be performed on the integer pixel samples (P1 and P2 in FIG. 11) of up to the second column from the block boundary.

The smoothing process may be performed using the integer pixel samples of the current picture and the integer pixel samples of the reference block in consideration of discontinuity in the boundary between the current picture and the reference picture.

Various smoothing filters may be applied depending on the positions of the integer pixel samples to be smoothed. For example, when the smoothing process is performed on only P2, various filters of from a 3-tap filter to an 8-tap filter may be applied. When the smoothing process is performed on P1 and P2, it is difficult to apply the 3-tap filter using the integer pixel samples of the reference block to P1. Accordingly, the same 4-tap or more-tap filter may be applied to P1 and P2 or filters to be applied to P1 and P2 may be selected, respectively, so as to exclude the application of the 3-tap filter to P1. When the smoothing process is performed on all of P0, P1, and P2, the same 5-tap or more-tap filter may be applied to all of P0, P1, and P2 or filters to be applied to P0, P1, and P2 may be selected, respectively, so as to apply the 5-tap or more-tap filter to P0 and to apply the 4-tap or more-tap filter to P1. Here, the applied filters and the coefficients thereof may be separately determined if necessary, or filters and/or coefficients used in the system may be utilized. For example, when the 8-tap filter is used, the coefficients of the interpolation filter to be applied to the luma pixel samples may be utilized. When the 4-tap filter is used, the coefficients of the interpolation filter to be applied to the chroma pixel samples may be utilized.

When it is assumed that the smoothing process is performed on only P2 and the 3-tap filter is used, P2' subjected to the smoothing may be calculated by Expression 17.

$$P2' = (P1+P2+2P3+2)>>2 \quad \text{Expression 17}$$

Referring to FIG. 11, P1 and P2 in Expression 17 are reconstructed integer pixel samples of the current picture and P3 is an integer pixel sample of the reference block. It is possible to further enhance the interpolation effect by performing the interpolation using the integer pixel samples subjected to the smoothing. On the other hand, the filter and the coefficient of Expression 17 are introduced for the purpose of convenience of explanation, and various filters and coefficients may be applied if necessary in the present invention.

Figure 14:
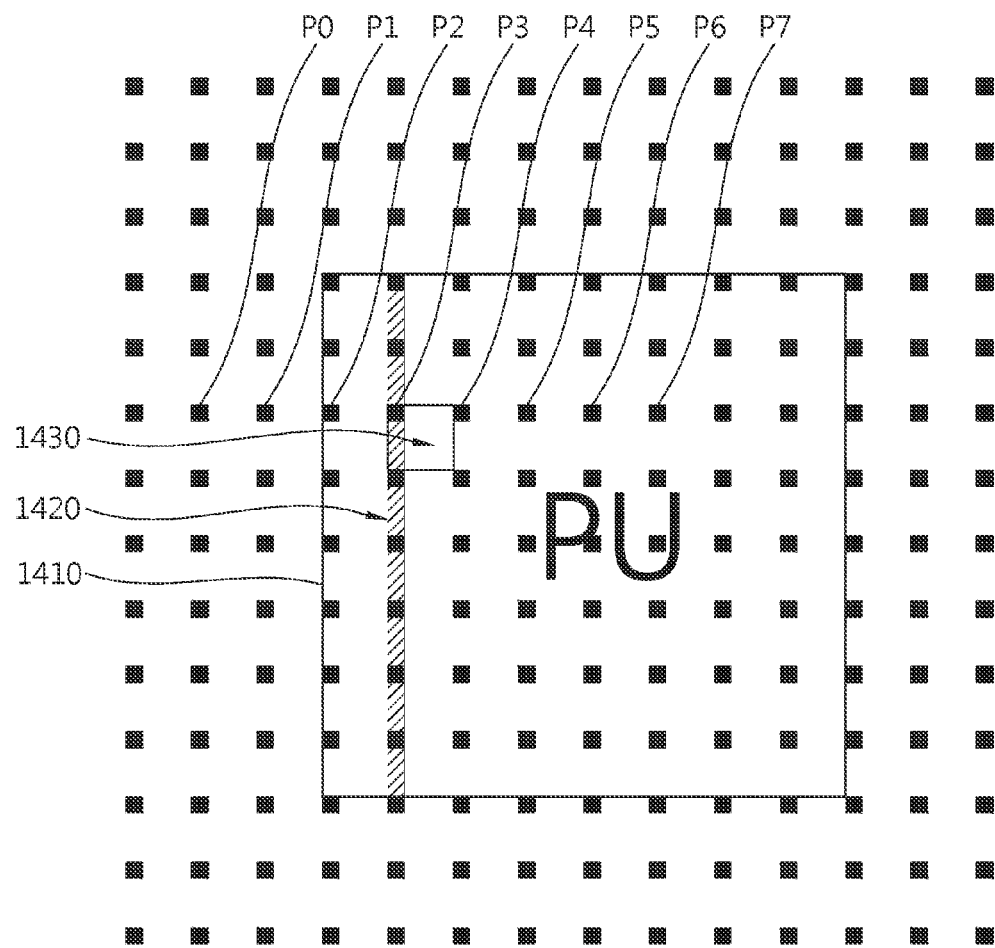
FIGS. 14 to 18 are diagrams schematically illustrating examples depending on a position of a reference integer sample in a reference block corresponding to a prediction unit.

2. Case where Fractional Pixel Samples a, b, and c are Generated and Reference Integer Sample is Located in Second Integer Sample Column of Reference Block FIG. 14 is a diagram schematically illustrating an example where a reference integer sample in a reference block corresponding to a prediction unit 1410 is located in a second integer sample column 1420 from the left boundary of the reference block. In FIG. 14, P0, . . . , P7 represent integer pixels (values), and P0, . . . , P7 may be luma pixels or chroma pixels. In FIG. 14, when the 4-tap filter is applied to interpolate the chroma pixels, the reconstructed chroma integer pixel samples of the current picture may not be used for the interpolation of generating the fractional pixel samples, unlike the case illustrated in FIG. 11. In FIG. 14, it is assumed that the prediction unit is an 8×8 block.

(1) Interpolation of Luma Sample

Referring to FIG. 14, the integer pixel samples P0 and P1 are the reconstructed pixels of the current picture and are used for the interpolation. In an interpolation area 1430, similarly to the interpolation area 1130A illustrated in FIG. 12, the fractional pixel samples a to r are generated by interpolation with respect to the reference integer sample P3.

In FIG. 14, P0 and P1 are reconstructed integer pixel samples of the current picture and P2 to P7 are integer pixel samples of the reference block, unlike the case illustrated in FIG. 11.

In FIG. 14, the fractional pixel samples may be calculated by interpolation using the reconstructed pixel samples P0 and P1 of the current picture and the pixel samples P2 to P7 of the reference picture. Coefficients of the filter used for the interpolation may be determined in various methods. Expression 16 described with reference to FIG. 11 may be an example of the interpolation filter which can be applied to this case.

(2) Pre-Process—Smoothing on Reconstructed Integer Samples of Current Picture

In FIG. 14, the smoothing process may be performed on all the reconstructed integer pixel samples (P0 and P1 of FIG. 14) of the current picture to be used for the interpolation, or the smoothing process may be applied on only the pixel sample (P1 in FIG. 14) closest to the block boundary.

When the smoothing process is performed on only P1, various filters of from a 3-tap filter to an 8-tap filter may be applied. When the smoothing process is performed on P0 and P1, it is difficult to apply the 3-tap filter using the integer pixel samples of the reference block to P0. Accordingly, the same 4-tap or more-tap filter may be applied to P0 and P1 or filters to be applied to P0 and P1 may be selected, respectively, so as to exclude the application of the 3-tap filter to P1.

The filters and the coefficients to be applied may be selected in various methods as described above. When it is assumed that the smoothing process is performed on only P1 and the 3-tap filter is used, P1' subjected to the smoothing may be calculated by Expression 18.

$$P1'=(P0+P1+2P2+2)>>2 \qquad \text{Expression 18}$$

Referring to FIG. 14, P0 and P1 in Expression 18 are reconstructed integer pixel samples of the current picture and P2 is an integer pixel sample of the reference block. On the other hand, the filter and the coefficient of Expression 18 are introduced for the purpose of convenience of explanation, and various filters and coefficients may be applied if necessary in the present invention.

3. Case where Fractional Pixel Samples a, b, and c are Generated and Reference Integer Sample is Located in Third Integer Sample Column of Reference Block FIG. 15 is a diagram schematically illustrating an example where a reference integer sample in a reference block corresponding to a prediction unit 1510 is located in a third integer sample column 1520 from the left boundary of the reference block. In FIG. 15, P0, . . . , P7 represent integer pixels (values), and P0, . . . , P7 may be luma pixels or chroma pixels. In FIG. 15, when the 4-tap filter is applied to interpolate the chroma pixels, the reconstructed chroma integer pixel samples of the current picture may not be used for the interpolation of generating the fractional pixel samples, unlike the case illustrated in FIG. 14. In FIG. 15, it is assumed that the prediction unit is an 8×8 block.

(1) Interpolation of Luma Sample

Referring to FIG. 15, the integer pixel samples P0 and P1 are the reconstructed pixels of the current picture and are used for the interpolation. In an interpolation area 1530, similarly to the interpolation area 1130A illustrated in FIG. 12, the fractional pixel samples a to r are generated by interpolation with respect to the reference integer sample P3.

In FIG. 15, P0 is a reconstructed integer pixel sample of the current picture and P1 to P7 are integer pixel samples of the reference block, unlike the case illustrated in FIGS. 11 and 14.

In FIG. 15, the fractional pixel samples may be calculated by interpolation using the reconstructed pixel sample P0 of the current picture and the pixel samples P1 to P7 of the reference picture. Coefficients of the filter used for the interpolation may be determined in various methods. Expression 16 described with reference to FIG. 11 may be an example of the interpolation filter which can be applied to this case.

(2) Pre-Process—Smoothing on Reconstructed Integer Samples of Current Picture

In FIG. 15, the smoothing process may be performed on the reconstructed integer pixel sample P0 of the current picture to be used for the interpolation. Here, various filters of from a 3-tap filter to an 8-tap filter may be applied to P0. The filters and the coefficients to be applied may be selected in various methods as described above. When it is assumed that the 3-tap filter is applied to P0, P0' subjected to the smoothing may be calculated by Expression 19.

$$P0'=(P0_B+P0+2P1+2)>>2 \qquad \text{Expression 19}$$

Referring to FIG. 15, P0 in Expression 19 is a reconstructed integer pixel sample of the current picture and P1 is an integer pixel sample of the reference block. Although not illustrated in FIG. 15, $P0_E$ is an integer pixel sample located on the left side of P0 and is a reconstructed pixel sample of the current picture. On the other hand, the filter and the coefficient of Expression 19 are introduced for the purpose of convenience of explanation, and various filters and coefficients may be applied if necessary in the present invention.

Figure 16:
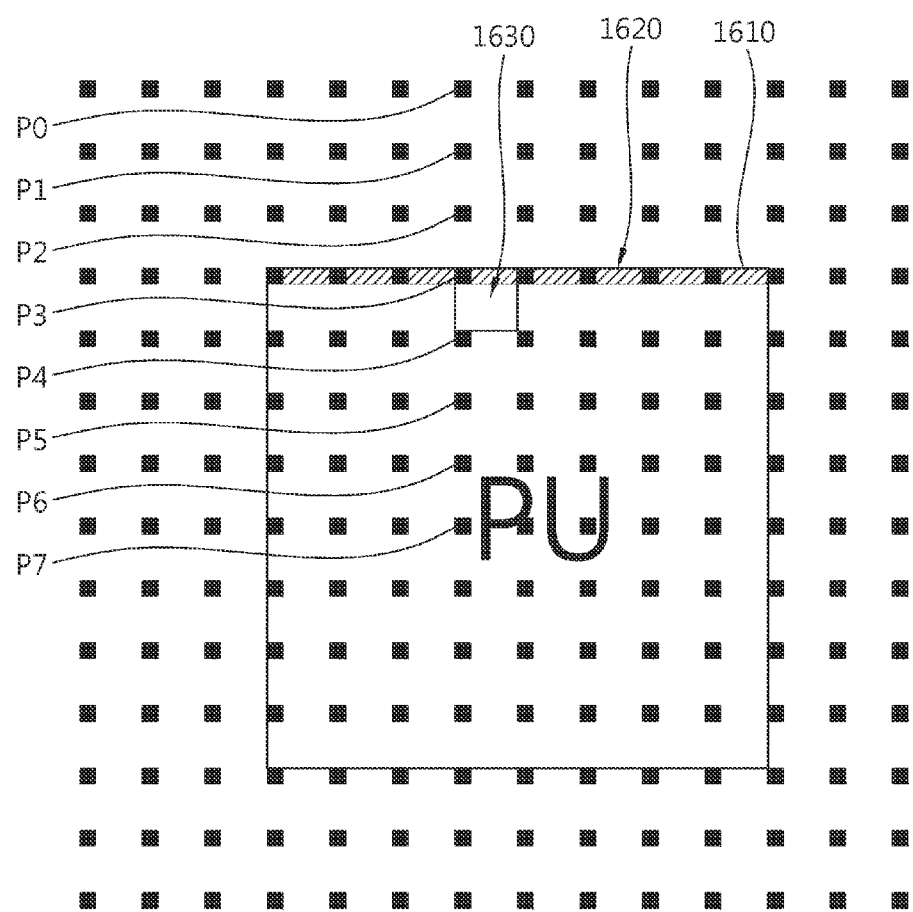

4. Case where Fractional Pixel Samples a, b, c, and ba are Generated and Reference Integer Sample is Located in First Integer Sample Row of Reference Block FIG. 16 is a diagram schematically illustrating an example where a reference integer sample for generating fractional samples less than an integer unit in a reference block corresponding to a prediction unit 1610 is located in a first integer sample row 1620 from the top boundary of the reference block. In FIG. 16, P0, . . . , P7 represent integer pixels (values), and P0, . . . , P7 may be luma pixels or chroma pixels. In FIG. 16, it is assumed that the prediction unit is an 8×8 block.

(1) Interpolation of Luma Sample

In case of luma pixels, fractional pixel samples such as $a_{0,0}$ to $r_{0,0}$ in the area 710 illustrated in FIG. 7 are generated in the unit of ¼ pixels by interpolation using the 8-tap filter in the interpolation area 1630.

In FIG. 16, since a reference integer sample P3 is located in the first integer pixel sample column in the reference block, three reconstructed pixel samples of a current picture may be used for the interpolation. Referring to FIG. 16, the integer pixel samples P0, P1, and P2 are used as the reconstructed pixels of the current picture for the interpolation.

In the interpolation area 1630, similarly to the interpolation area 1130A illustrated in FIG. 12, the fractional pixel samples a to r are generated by interpolation with respect to the reference integer sample P3.

Coefficients of the filter used for the interpolation may be determined in various methods. For example, when the filter coefficients used to derive Expression 1 are used, d, h, and n of the fractional pixel samples may be calculated by Expression 20.

$$d=\text{Clip3}(0,(1<<14)-1,(-P0+4P1-10P2+57P3+19P4-7P5+3P6-P7+\text{offset1})>>\text{shift1})$$

$$h=\text{Clip3}(0,(1<<14)-1,(-P0+4P1-11P2+40P3+40P4-11P5+4P6-P7+\text{offset1}))>>\text{shift1})$$

$$n=\text{Clip3}(0,(1<<14)-1,(-P0+3P1-7P2+19P3+57P4-10P5+4P6-P7+\text{offset1})>>\text{shift1}) \qquad \text{Expression 20}$$

On the other hand, when the integer pixel samples located in the columns of up to the third column from the left boundary of the reference block 1610 are used as a reference integer sample, the fractional pixel samples a, b, and c may be generated using the reconstructed integer pixel samples of the current picture as described above (see the methods of 1 to 3). When the reference integer sample is located within the fourth column from the left boundary of the reference block 1610, the fractional pixel samples a, b, and c may be calculated using the interpolation filter using the integer pixel samples of the reference picture, for example, using the interpolation filter expressed by Expression 1.

The fractional pixel samples e, f, g, i, j, k, p, q, and r may be calculated using the values of a, b, c, d, h, and n. For example, Expressions 3 and 4 may be applied to a, b, c, d, h, and n to calculate the other fractional pixel samples. The positions corresponding to the calculated fractional pixel sample values may be calculated, for example, using Expression 7 and Table 2.

(2) Interpolation of Chroma Sample

In case of chroma pixels, fractional pixel samples such as $ab_{0,0}$ to $hh_{0,0}$ in the area 810 illustrated in FIG. 8 are generated in the unit of ⅛ pixels by interpolation using the 4-tap filter in the interpolation area 1630. Therefore, unlike the case of luma pixels, the interpolation is performed using four integer pixels P2, P3, P4, and P5. Since the reference integer pixel P3 is located in the first integer sample row, one P2 of the reconstructed pixel samples of the current picture is used for the interpolation using the 4-tap filter.

In the interpolation area 1630, similarly to the interpolation area 1130B illustrated in FIG. 13, the fractional pixel samples a to r are generated by interpolation with respect to the reference integer sample P3.

Coefficients of the filter used for the interpolation may be determined in various methods. For example, when the filter coefficients used to derive Expression 9 are used, ba, ca, da, ea, fa, ga, and ha of the fractional pixel samples may be calculated by Expression 21.

$$ba = \text{Clip3}(0,(1<<14)-1,(-3P2+60P3+8P4-P5+\text{offset1})>>\text{shift1})$$

$$ca = \text{Clip3}(0,(1<<14)-1,(-4P2+54P3+16P4-2P5+\text{offset1})>>\text{shift1})$$

$$da = \text{Clip3}(0,(1<<14)-1,(-5P2+46P3+27P4-4P5+\text{offset1})>>\text{shift1})$$

$$ea = \text{Clip3}(0,(1<<14)-1,(-4P2+36P3+36P4-4P5+\text{offset1})>>\text{shift1})$$

$$fa = \text{Clip3}(0,(1<<14)-1,(-4P2+27P3+46P4-5P5+\text{offset1})>>\text{shift1})$$

$$ga = \text{Clip3}(0,(1<<14)-1,(-2P2+16P3+54P4-4P5+\text{offset1}))\text{shift1})$$

$$ha = \text{Clip3}(0,(1<<14)-1,(-P2+8P3+60P4-3P5+\text{offset1})>>\text{shift1}) \quad \text{Expression 21}$$

On the other hand, when the integer pixel samples located in the first column from the left boundary of the reference block 1610 are used as a reference integer sample, the fractional pixel samples ba, ca, da, ea, fa, ga, and ha may be generated using the reconstructed integer pixel samples of the current picture as described above (see the method of 1). When the reference integer pixel is located within the second column from the left boundary of the reference block 1610, the integer pixel samples of the reference picture may be used to calculate the fractional pixel samples ba, ca, da, ea, fa, ga, and ha, for example, using Expression 9.

The other fractional pixel samples in the interpolation area 1630 may be calculated using the values of ab, ac, ad, ae, af, ag, ah, ba, ca, da, ea, fa, ga, ha. For example, Expressions 10 and 11 may be applied to ab, ac, ad, ae, af, ag, ah, ba, ca, da, ea, fa, ga, and ha to calculate the other fractional pixel samples. The positions corresponding to the calculated fractional pixel sample values may be calculated, for example, using Expression 12 and Table 5.

(3) Pre-Process—Smoothing on Reconstructed Integer Samples of Current Picture

Figure 18:
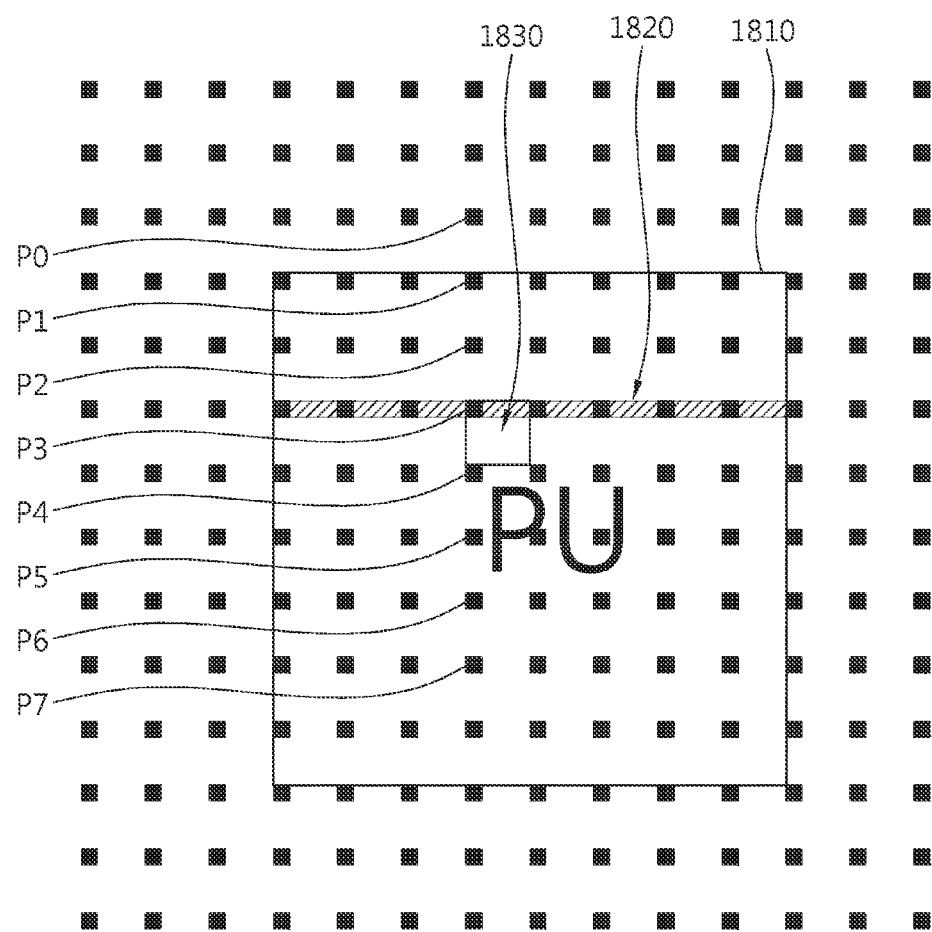

The smoothing process as a pre-process applicable to the case illustrated in FIG. 24 may be performed similarly to the smoothing process described with reference to FIG. 11. Unlike the case of FIG. 11, the reconstructed integer pixel samples of the current picture and the integer pixel samples of the reference block used for the interpolation illustrated in FIG. 18 are located in the same row 2420 as illustrated in FIG. 18.

Figure 17:
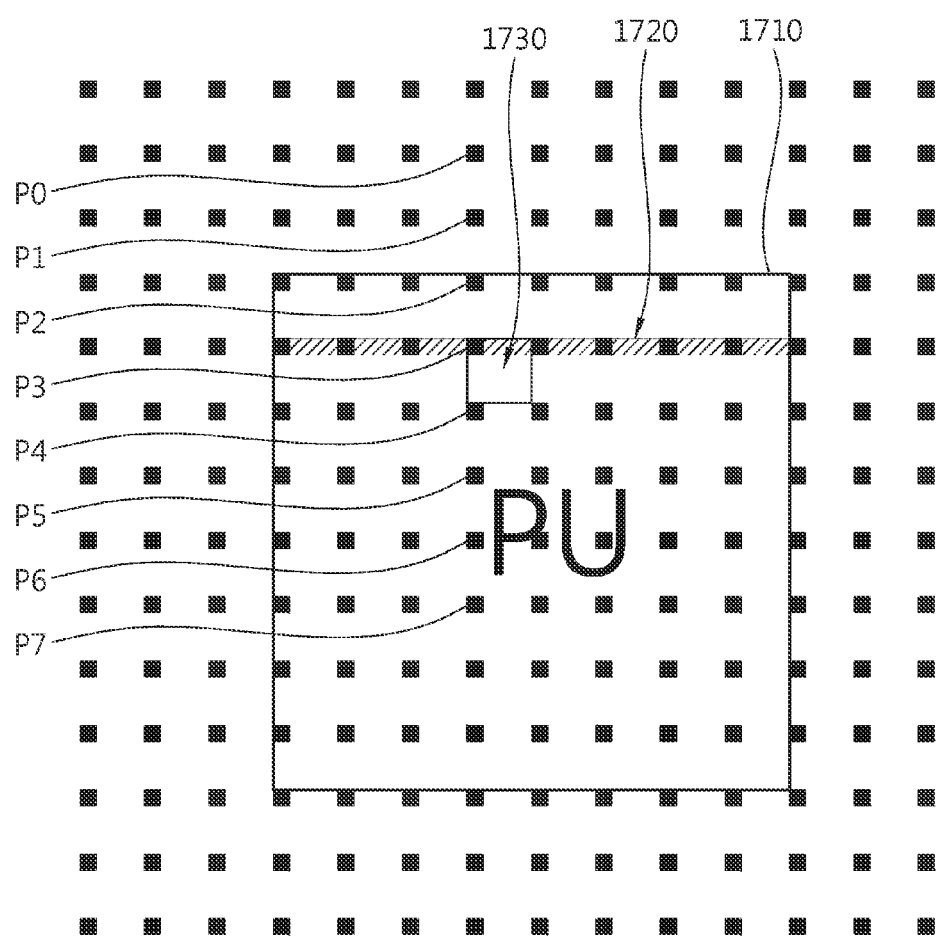

5. Case where Fractional Pixel Samples d, h, and n are Generated and Reference Integer Sample is Located in Second Integer Sample Row of Reference Block FIG. 17 is a diagram schematically illustrating an example where a reference integer sample in a reference block corresponding to a prediction unit 1710 is located in a second integer sample row 1720 from the top boundary of the reference block. In FIG. 17, P0, . . . , P7 represent integer pixels (values), and P0, . . . , P7 may be luma pixels or chroma pixels. In FIG. 17, when the 4-tap filter is applied to interpolate the chroma pixels, the reconstructed chroma integer pixel samples of the current picture may not be used for the interpolation of generating the fractional pixel samples, unlike the case illustrated in FIG. 16. In FIG. 17, it is assumed that the prediction unit is an 8×8 block.

(1) Interpolation of Luma Sample

Referring to FIG. 17, the integer pixel samples P0 and P1 are the reconstructed pixels of the current picture and are used for the interpolation. In an interpolation area 2530, similarly to the interpolation area 1130A illustrated in FIG. 12, the fractional pixel samples a to r are generated by interpolation with respect to the reference integer sample P3.

In FIG. 17, P0 and P1 are reconstructed integer pixel samples of the current picture and P2 to P7 are integer pixel samples of the reference block, unlike the case illustrated in FIG. 16.

In FIG. 17, the fractional pixel samples may be calculated by interpolation using the reconstructed pixel samples P0 and P1 of the current picture and the pixel samples P2 to P7 of the reference picture. Coefficients of the filter used for the interpolation may be determined in various methods. Expression 20 described with reference to FIG. 16 may be an example of the interpolation filter which can be applied to this case.

(2) Pre-Process—Smoothing on Reconstructed Integer Samples of Current Picture

The smoothing process as a pre-process applicable to the case illustrated in FIG. 17 may be performed similarly to the smoothing process described with reference to FIG. 14. Unlike the case of FIG. 14, the reconstructed integer pixel samples of the current picture and the integer pixel samples of the reference block used for the interpolation illustrated in FIG. 17 are located in the same row 1720 as illustrated in FIG. 17.

6. Case where Fractional Pixel Samples d, h, and n are Generated and Reference Integer Sample is Located in Third Integer Sample Row of Reference Block FIG. 18 is a diagram schematically illustrating an example where a reference integer sample in a reference block corresponding to a prediction unit 1810 is located in a third integer sample row 1820 from the left boundary of the reference block. In FIG. 18, P0, . . . , P7 represent integer pixels (values), and P0, . . . , P7 may be luma pixels or chroma pixels. In FIG. 18, when the 4-tap filter is applied to interpolate the chroma pixels, the reconstructed chroma integer pixel samples of the current picture may not be used for the interpolation of generating the fractional pixel samples, unlike the case illustrated in FIG. 17. In FIG. 18, it is assumed that the prediction unit is an 8×8 block.

(1) Interpolation of Luma Sample

Referring to FIG. 18, the integer pixel samples P0 and P1 are the reconstructed pixels of the current picture and are used for the interpolation. In an interpolation area 1830, similarly to the interpolation area 1130A illustrated in FIG. 12, the fractional pixel samples a to r are generated by interpolation with respect to the reference integer sample P3.

In FIG. 18, P0 is a reconstructed integer pixel sample of the current picture and P1 to P7 are integer pixel samples of the reference block, unlike the case illustrated in FIGS. 16 and 17.

In FIG. 18, the fractional pixel samples may be calculated by interpolation using the reconstructed pixel sample P0 of the current picture and the pixel samples P1 to P7 of the reference picture. Coefficients of the filter used for the interpolation may be determined in various methods. Expression 20 described with reference to FIG. 16 may be an example of the interpolation filter which can be applied to this case.

(2) Pre-Process—Smoothing on Reconstructed Integer Samples of Current Picture

The smoothing process as a pre-process applicable to the case illustrated in FIG. 18 may be performed similarly to the smoothing process described with reference to FIG. 15. Unlike the case of FIG. 15, the reconstructed integer pixel samples of the current picture and the integer pixel samples of the reference block used for the interpolation illustrated in FIG. 18 are located in the same row 1820 as illustrated in FIG. 18.

On the other hand, when the interpolation is performed using together the reconstructed pixel samples of the current picture and the pixel samples of the reference picture as described above, the encoder may transmit relevant information to the decoder. For example, the encoder may include information indicating that the interpolation for generating a predicted block is performed using the reconstructed pixel samples of the current picture in the information such as a block type and motion information related to the current picture (a current target block such as a current coding unit, a current prediction unit, and/or a current transform unit) and may transmit the information pieces together. The information indicating whether the interpolation is performed using the reconstructed pixel samples of the current picture may be indicated by a 1-bit flag.

In addition to the method of explicitly transmitting the information indicating whether the interpolation is performed using the reconstructed pixel samples of the current picture, the information may be transmitted to the decoder using an implicit method. For example, by comparing motion vectors of a corresponding block and a neighboring block and determining whether the difference between the two motion vectors is greater than a predetermined threshold value, the decoder may recognize whether the reconstructed pixel samples of the current picture are used for the interpolation.

While an 8×8 block is described as an example of a prediction unit in the cases of 1 to 6, this is only an example of the present invention and the present invention is not limited to this example. The present invention may be applied to various cases where the prediction block is a 4×4 block, a 16×16 block, a 32×32 block, and a 64×64 block.

Figure 19:
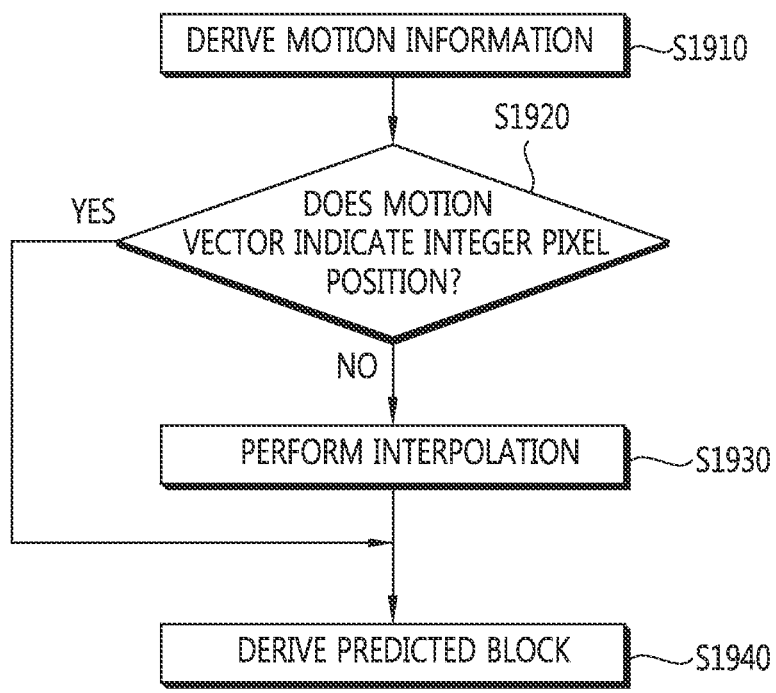
FIG. 19 is a flowchart schematically illustrating a method of generating a predicted block in a decoder according to an embodiment of the present invention.

FIG. 19 is a flowchart schematically illustrating a method of generating a predicted block, which is performed by a decoder according to the present invention.

Referring to FIG. 19, the prediction module of the decoder derives motion information (S1910). The motion information includes motion information on the corresponding prediction unit and a reference picture index.

Then, the prediction module determines whether the motion vector indicates an integer pixel position (S1920). As described above, the motion vector may be expressed by ¼ pixel units in case of luma pixels and may be expressed by ⅛ pixel units in case of chroma pixels.

When the motion vector does not indicate an integer pixel position, that is, when the motion vector indicates a sub pixel position less than an integer pixel unit, the prediction module needs to perform an interpolation process for generating pixel information by fractional sample units so as to generate the predicted block.

The information for performing an interpolation process is derived from the previously-generated motion information. For example, the interpolation area and the reference integer sample may be specified through this process.

When the motion vector indicates a sub pixel position, the prediction module performs an interpolation process for generating fractional pixel samples less than an integer unit using the integer pixel samples (S1930).

Here, the prediction module may confirm whether the reference integer sample of the interpolation area is within a predetermined range, that is, within a range in which the reconstructed pixel samples of the current picture can be used for the interpolation. For example, when the interpolation is performed on luma pixels, the prediction module may confirm whether the reference integer sample is located within the third integer sample row from the top boundary of a reference block corresponding to the current prediction unit or within the third integer sample column from the left boundary thereof. When the interpolation is performed on chroma pixels, the prediction module may confirm whether the reference integer sample is located in the first integer sample row from the top boundary of a reference block corresponding to the current prediction unit or in the first integer sample column from the left boundary thereof.

The prediction module of the decoder may perform a pre-process necessary for the interpolation, when it is confirmed that the reference integer sample of the interpolation area is located within a predetermined range.

For example, when the interpolation is performed on luma pixels and the reference integer sample is located within the third integer sample row/column from the top/left boundary of a reference block corresponding to the current prediction unit and when the interpolation is performed on chroma pixels and the reference integer sample is located in the first integer sample row/column from the top/left boundary of a reference block corresponding to the current prediction unit, the smoothing process as the pre-process of the interpolation may be performed on the pixel samples of the current picture to be used for the interpolation. The smoothing method performed as the pre-process is the same as described above.

As described above, the prediction module may generate the fractional pixel samples by ¼ pixel units by interpolation for luma pixels, and may generate the fractional pixel sample by ⅛ pixel units by interpolation for chroma pixels.

In the present invention, when the reference integer sample of the interpolation area is located within a predetermined range, the prediction module may perform the interpolation using together the integer pixel samples of the current picture and the pixel samples of the reference block. The specific interpolation method is the same as described above.

The prediction module derives a predicted block (S1940). The prediction module generates the predicted block on the basis of the motion vector and the reference block when the motion vector indicates an integer pixel position, and generates the predicted block on the basis of the motion vector and the pixel samples calculated through the interpolation.

As described above, the pixel sample values of the predicted block area pixel sample values corresponding to the pixel positions expressed by fractional sample unit offsets from the reference integer sample. For example, the offset may be given as $(xFrac_L, yFrac_L)$ when the interpolation is performed on luma pixels, and the offset may be given as $(xFrac_C, yFrac_L)$ when the interpolation is performed on chroma pixels. In this case, the values of the predicted pixel samples specified by the offsets with respect to the reference integer sample may be acquired, for example, from table 3 for luma pixels and may be acquired, for example, from Table 5 for chroma pixels.

On the other hand, regarding whether the reconstructed integer pixel samples of the current picture should be used in the interpolation method illustrated in FIG. 19, an explicit or implicit instruction may be transmitted from the encoder to the decoder as described above. When the reference integer sample is located within the third integer sample row/column from the top/left boundary of the reference block corresponding to the current prediction unit, the reconstructed integer pixel samples of the current picture may be determined to be used for the interpolation.

Therefore, when an instruction on whether the reconstructed pixel samples of the current picture are used is transmitted from the encoder, a step of determining whether the instruction is given and/or what the instruction details are may be performed before. In this case, when an instruction to use the reconstructed pixel samples of the current picture is not given, the interpolation may be performed using only the pixel samples of the reference picture without using the reconstructed pixel samples of the current picture.

While the methods in the above-mentioned exemplary system have been described on the basis of flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. An inter prediction method comprising the steps of:
    calculating a motion vector for generating a predicted block;
    performing an interpolation process of generating pixel samples in the unit of sub pixels when the motion vector indicates a sub pixel position; and
    generating the predicted block on the basis of the pixel samples in the unit of sub pixels,
    wherein, in the interpolation process, reconstructed pixel samples of a current picture and reference pixel samples of a reference picture are together used with predetermined interpolation filter coefficients for generating the pixel samples in the unit of sub pixels,
    wherein the step of generating the pixel samples in the unit of sub pixels is based on an integer sample set including integer pixel samples to which the interpolation process is applied,
    wherein the integer sample set includes at least one current integer sample out of the reconstructed pixel samples,
    wherein the at least one current integer sample is used to generate the pixel samples in the unit of sub pixels, and
    wherein the pixel samples in the unit of sub pixels correspond to offset positions relative to a predetermined reference pixel sample out of the integer pixel samples.

2. The inter prediction method according to claim 1, wherein the reconstructed pixel samples of the current picture are located in an upper or left area of a current prediction unit in the current picture, and the reference pixel samples of the reference picture are positioned in at least one of a below area and right area of a reference block in the reference picture.

3. The inter prediction method according to claim 1, wherein a smoothing process using at least one of the reconstructed pixel samples of the current picture and at least one of the reference pixel samples of the reference picture is performed on the reconstructed pixel samples of the current picture before the step of performing the interpolation process.

4. The method of claim 1, wherein the interpolation process is regarding to luma pixels, and
    wherein the step of generating the pixel samples in the unit of sub pixels includes setting a predetermined number of current integer samples to be included in the integer sample set depending on the position of the reference pixel sample.

5. The method of claim 4, wherein three current integer samples are included in the integer sample set when the reference pixel sample is located in a first integer sample column or row from a boundary between a reconstructed pixel sample area of the current picture and a reference sample area of the reference picture used for the interpolation,
    wherein two current integer samples are included in the integer sample set when the reference pixel sample is located in a second integer pixel sample column or row from the boundary, and
    wherein one current integer sample is included in the integer sample set when the reference pixel sample is located in a third integer pixel sample column or row form the boundary.

6. The method of claim 5, further comprising a step of applying a smoothing filter, which uses at least one reference pixel sample and at least one reconstructed pixel sample of the current picture, to at least one current integer sample out of the current integer samples before generating the pixel samples in the unit of sub pixels.

7. The method of claim 1, wherein the interpolation process is regarding to chroma pixels, and
    wherein the step of generating the pixel samples in the unit of sub pixels includes setting a predetermined number of current integer samples to be included in the integer sample set depending on the position of the reference pixel sample.

8. The method of claim 7, wherein one current integer sample is included in the integer sample set when the reference pixel sample is located in a first integer sample column or row from a boundary between a reconstructed pixel sample area of the current picture and a reference sample area of the reference picture which are used for the interpolation.

9. The method of claim 8, further comprising a step of applying a smoothing filter, which uses at least one reference pixel sample and at least one reconstructed pixel sample of the current picture, to at least one current integer sample out of the current integer samples before generating the pixel samples in the unit of sub pixels.

10. The method of claim 1, further comprising a step of determining whether an implicit or explicit instruction to use the integer pixel samples of the current picture to generate the pixel samples in the unit of sub pixels is transmitted from an encoder,
   wherein when it is determined that the instruction is transmitted, the integer pixel samples of the current picture are used to generate the pixel samples in the unit of sub pixels.

11. The method of claim 10, wherein the explicit instruction is 1-bit flag information which is transmitted from the encoder to a decoder along with pixel position information and information on an array of reference pixel samples.

12. The method of claim 10, wherein when a difference between a motion vector of a current prediction unit and a motion vector of a neighboring block of the current prediction unit is equal to or less than a predetermined threshold value, it is determined that an implicit instruction to use the integer pixel samples of the current picture to generate the fractional pixel samples is transmitted.

13. The method of claim 1, wherein the interpolation process is regarding to luma pixels, and
   wherein the integer pixel samples of the current picture are used for the interpolation when a reference integer sample is located within a third integer sample row or column from an upper or left boundary of a reference sample area of a reference picture used for the interpolation.

14. The method of claim 1, wherein the interpolation method is regarding to chroma pixels, and
   wherein the integer pixel samples of the current picture are used for the interpolation when a reference integer sample is located within a first integer sample row or column from an upper or left boundary of a reference sample area of a reference picture used for the interpolation.

* * * * *